US005864337A

United States Patent [19]
Marvin

[11] Patent Number: 5,864,337
[45] Date of Patent: Jan. 26, 1999

[54] MEHTOD FOR AUTOMATICALLY ASSOCIATING MULTIMEDIA FEATURES WITH MAP VIEWS DISPLAYED BY A COMPUTER-IMPLEMENTED ATLAS PROGRAM

[75] Inventor: John Marvin, Kirkland, Wash.

[73] Assignee: Microsoft Corporation, Redmond, Wash.

[21] Appl. No.: 898,286

[22] Filed: Jul. 22, 1997

[51] Int. Cl.[6] ....................................................... G06F 3/00
[52] U.S. Cl. ............................................................. 345/338
[58] Field of Search .................................. 345/338, 339, 345/348, 349, 354, 356, 357

[56] References Cited

U.S. PATENT DOCUMENTS

| | | | |
|---|---|---|---|
| 5,539,869 | 7/1996 | Spoto et al. | 345/336 |
| 5,559,707 | 9/1996 | DeLrme et al. | 701/200 |
| 5,754,176 | 5/1998 | Crawford | 345/338 |
| 5,781,195 | 7/1998 | Marvin | 345/428 |

OTHER PUBLICATIONS

Williams, BS, "An Internet atlas of mouse development," Computerized medical imaging and graphics,1996, v20, n6, pp. 433–447.
Nakano, H., "Recent issues and progress in multimedia map technology, " NTT R&D, v46, n8, pp. 843–850, 1997.
Bertolucci, J., "Atlas P166," computer Life, v3, n11, 192(1).
Linzmayer, O.W., "Local expert and NavigaTour," MacUser, v9, n10, p. 62(2), 1993.
Odvard, E.D., "Not your parents' reference," Technology & Learning, v18, n6, p. 11(7).
English, D., "the world on a platter," Compute!, v15, n7, p. 70(1), 1993.
"Attica/Ordnance survey Interactive Atlas of Great Britain," AirteQ Ltd. 1996.
Ryan, M., "eD Atlas," PC Magazine, 1995, v14, n16, p. 389(1).
Messier, P., "World Vista Multimedia Atlas," CD–ROM World, v9, n4, p. 101(1), 1994.
Pope, D., "Multidimensional Maps as Multimedia," Digital Computing, p. 10(1), Jul./Aug. 1995.
"PC Globe Maps 'N' Facts: CArtopedia," Family PC, v3, n4, p. 79(1), 1996.
"Microsoft Automap TRip Panner 1997 edition," Home, PC, 1997, n4066 p. 112.
Brown, B., "Rand McNally TropMaker Delux 98," PC Magazine v16, n18, p. 49(2).
Pack, Thomas, "3D talking globe," Information Today, 1997, v14, n5, p. 42(1).

Primary Examiner—A. Katbab
Attorney, Agent, or Firm—Jones & Askew, LLP

[57] ABSTRACT

A method for automatically assigning multimedia features to map views selected "on the fly" in a computer-based multimedia atlas program. The atlas program allows a user to pan and zoom over the globe so that the map views selected by the user are not necessarily the best-view map of any particular map entity. The multimedia atlas program assigns a "place context" to a selected map view, which identifies and serves as the title of the map. The place context is a particular map entity that has an associated set of multimedia features, such as videos, music, pictures, etc. Control items associated with the multimedia features for the place context are then displayed for selection by the user. A "parent context," which identifies a larger map that the selected map view is a part of, is also assigned to the selected map view. The user may select a parent context control item to cause the control items for selecting the multimedia features for the parent context to be displayed for selection by the user. Selecting the parent context control item may also change the map view to a best-view map of the parent entity.

25 Claims, 13 Drawing Sheets

MEHTOD FOR AUTOMATICALLY ASSOCIATING MULTIMEDIA FEATURES WITH MAP VIEWS DISPLAYED BY A COMPUTER-IMPLEMENTED ATLAS PROGRAM

TECHNICAL FIELD

The present invention relates to computer-implemented multimedia atlas programs and, more particularly, to a method for automatically associating multimedia features with map views displayed by the multimedia atlas program.

BACKGROUND OF THE INVENTION

Lewis and Clark had to cross the Nation by canoe and horseback to obtain the information necessary to create the first rudimentary maps the vast Northwest territories of the fledgling United States. Modern "desktop explorers" are not so hindered. Thanks to personal computers and world atlas software, accurate maps of the surface of the Earth can be accessed in seconds from the comfort of one's home or office. Modern atlas software, however, provides much more than accurate maps. Increasingly powerful personal computers and atlas software allow specific locales to be correlated with multimedia features, such as tabular, pictorial, graphical, video, and audio information to reward the desktop explorer with entertaining and informative multimedia visits to far away places.

These multimedia features make computer software "come alive" in an entertaining and user-friendly manner that allows children and adults with only basic computer skills to enjoy and learn as never before. Consumer demand is therefore strong for increasingly entertaining and informative multimedia software. The increasing data storage and processing capabilities of personal computers drive the need for innovation in the development of multimedia atlas software. New computer software techniques are constantly in demand to take advantage of the ever increasing hardware capabilities of personal computers. Much effort therefore goes into improving the speed, accuracy, and content of multimedia atlas software for personal computers.

In a multimedia atlas program, a particular map entity may have an associated set of multimedia features. A particular city, for instance, may have multimedia features such as videos describing the local culture and history, audio clips from famous sporting events and speeches held in the area, pictures from local universities and museums, etc. A user typically selects a multimedia feature by clicking on a control item displayed in a multimedia selection menu. These control items are usually correlated with the map displayed on the monitor. For example, the multimedia control items associated with Chicago are displayed when a map of Chicago is displayed, the multimedia control items associated with the Ohio are displayed when a map of the Ohio is displayed, etc.

Multimedia features are typically associated with significant political or geologic formations, such as continents, bodies of water, countries, regions, cities, mountain ranges, rivers, and so forth. Any particular map view may include all or part of more than one map entity that has associated multimedia features. For example, a map view of a portion of the Great Lakes region might include all or part of the following map entities, each of which has its own set of multimedia features: North America, United States, Canada, Great Lakes region, Michigan, Wisconsin, Illinois, Indiana, Ohio, Lake Michigan, Chicago, Green Bay, and so forth. In fact, the vast majority of map views include more than one map entity that has associated multimedia features. A low-altitude map of Chicago, for instance, displays a portion of North America, the United States, the Great Lakes region, Illinois, Lake Michigan, and Chicago.

Producing atlas software with real-time interactive tools, along with a generous complement of multimedia features, is a challenging task for the computer cartographer. A particularly compelling multimedia experience is produced when the user interacts with the atlas software in real-time by panning or zooming over a map image in response to user commands to simulate flying over the Earth. Such an interactive presentation of map data, together with a generous complement of multimedia features, is both entertaining and informative for users. With this type system, the user may "fly" over the globe from one locale to another, stopping along the way to experience multimedia visits at various locations.

The ability of the user to stop "flying" over virtually any position, orientation, and altitude allows the user to select from a very large number of possible map views. Once the user stops "flying" to select a particular map view, the multimedia atlas program renders the selected map view. Since the user has selected a new map view, it would be advantageous for the multimedia atlas program to update the multimedia selection menu to display the control items associated with the newly displayed map view. But allowing the user to select a map view by panning or zooming may make it difficult to determine which set of the multimedia features to associate with a particular map view.

To illustrate, consider a user who pans to a map view showing a portion of the Great Lakes region. In response, the multimedia selection menu could display the multimedia control items associated with any or all of the map entities in that map view that have associated multimedia features, which may include the World, North America, United States, Canada, Great Lakes region, Michigan, Wisconsin, Illinois, Indiana, Ohio, Lake Michigan, Chicago, Green Bay, etc. Since only a limited number of control items can be displayed at one time, it may not be possible to simultaneously display all of the control items associated with all of these map entities. In addition, prior art multimedia atlas programs are not configured to select a set of multimedia control items to display in association with a map view that has been selected using the panning or zooming tools.

One way to update the multimedia control items to correspond to new map views selected using the panning or zooming tools would be to store a predefined set of multimedia control items for every possible map view. But doing so would require a prohibitively large amount of memory. Prior art multimedia atlas programs, such as ENCARTA96 WORLD ATLAS, address this problem by displaying the multimedia control items for a particular map entity only in association with a best-view map of that locale. Thus, the multimedia control items for the United States are displayed only when the best-view map of the United states is displayed on the monitor, the multimedia control items for the Great Lakes region are displayed only when the best-view map of the Great Lakes region is displayed on the monitor, and so forth.

To facilitate the selection of map entities that have associated multimedia features, these prior art multimedia atlas programs typically include a "find" user interface tool that allows a user to type in the name of a desired map entity. Alternatively, the user may select a desired map entity from an alphabetized scroll list. In response to selection of a map entity using the "find" user interface tool, the best-view map of the selected map entity is displayed along with the multimedia control items for the selected map entity. The user may then select among the multimedia control items while viewing the best-view map of that map entity. If the user pans or zooms away from the best-view map, the multimedia control items are typically disabled.

Thus, if a user pans or zooms to a map view that shows a particular locale, the multimedia control items for the map entities in that map view are not automatically displayed. This limitation occurs because it is difficult for the multimedia atlas program to determine the appropriate context for a map view that a user has panned or zoomed to. That is, since most map view may display all or part of a number of map entities that have associated multimedia features, the multimedia atlas program cannot readily ascertain which control items to display in association with a particular map view. This aspect to the prior art multimedia atlas programs makes the selection of multimedia features cumbersome when the user selects map views using the pan and zoom modes.

Specifically, once a user pans or zooms to a particular map view, the user must then use the "find" user interface tool to fill the multimedia selection menu with the control items associated with a desired map entity. Making this selection replaces the map view with the best-view map of the selected map entity, which typically changes the position, altitude, and orientation of the displayed map view. In fact, selecting a relatively large scale map entity from a relatively low altitude map view, or vice verse, may drastically change the altitude of the map view. For example, selecting the best-view map of the Great Lakes region while viewing a low-altitude map of Chicago would drastically increase the altitude of the map view.

Thus, the prior art procedure for selecting multimedia features from the pan or zoom mode requires several steps, which novice users may not be familiar with. In addition, the procedure for selecting a multimedia feature causes the screen to be repainted with the best-view map of a selected map entity. This may break the continuity of the panning or zooming sequence, and thus diminish the experience of virtually "flying" from one locale to another and enjoying multimedia experiences at the various stops.

Therefore, there is a need for a multimedia atlas program that automatically associates multimedia control items with map views selected using a panning or zooming tool. There is a further need for a multimedia atlas program that automatically associates multimedia control items with map views without repainting the screen with the best-view map of a particular map entity.

SUMMARY OF THE INVENTION

The present invention provides a method for automatically associating multimedia features with a map view "on the fly." This allows multimedia features to be associated with a map view that a user selects using a pan or zoom tool. Thus, the user may view the multimedia features associated with the selected map view without having to first access a "find" user interface tool. In addition, the user may pan or zoom to a map view and then access the multimedia features associated with that map view without causing the to be screen repainted with the best-view map of a particular map entity. The invention thus enhances the experience of virtually "flying" from one locale to another and enjoying multimedia experiences at the various stops.

To associate multimedia features with map views "on the fly," the invention provides a method for assigning a "place context" to a selected map view. The place context, which identifies and serves as the title of the selected map view, is a particular map entity that has an associated set of multimedia features, such as videos, music, pictures, etc. Control items for selecting these multimedia features are then displayed for selection by the user. A "parent context," which identifies a larger map that the selected map view is a part of, is also assigned to the selected map view. The user may select a parent context control item to cause the control items for selecting the multimedia features for the parent context to be displayed. Selecting the parent context control item may also change the map view to a best-view map of the parent entity.

Generally described, the invention provides a method for associating multimedia features with map views in a computer system having a graphical user interface including a display device and a user input device. The computer system receives a map view selection command from the user input device indicating a selected map view. In response to the map view selection command, the computer system displays the selected map view on the display device and assigns a place context to the map view. The place context has an associated multimedia feature with an associated control item, which the computer system also displays on the display device. The computer system receives a multimedia feature selection command associated with the control item, such as a mouse click with the mouse pointer on the control item. In response, the computer system performs the selected multimedia feature.

Thus, the place context is assigned "on the fly" to the selected map view, which allows the multimedia control items to be activated in connection with map views that are selected using the panning or zooming tools. More specifically, the step of receiving a map view selection command may include receiving a pan or zoom command from the user input device. In response to the pan or zoom command, the computer system displays a panning or zooming sequence of map views. The computer system then receives a stop command indicating the selected map. Once the map view has been selected in this manner, the computer system assigns the place context to the map view and displays the control items for the multimedia features for the place context.

The computer system may also assign a parent context having an associated multimedia feature to the selected map view. In this case, the computer system displays a parent context control item on the display device. In response to a user command selecting the parent context control item, the computer system displays a control item associated with the parent context multimedia feature. Selecting the parent context control item may also change the map view to a best-view map of the parent entity. The computer system then receives a parent context multimedia feature selection command. In response, the computer system performs the selected multimedia feature.

According to an aspect of the invention, the step of assigning a place context to the map view may include assigning the place context to be a predefined large-scale context if the scale of the map is above a large-scale threshold. The computer system may also define a small zone within the map view and identify small zone entities that are wholly or partially displayed within the small zone. If the map displayed on the display device corresponds to a predefined best-view map associated with one of the small zone entities, the computer system assigns the place context to be the map entity associated with the predefined best-view map.

The step of assigning a place context to the map view may also include defining a large zone within the map view. The computer system identifies large zone entities that are wholly or partially displayed within the large zone, each large zone entity being associated with a "feature class." A feature class is a category of geographical objects such as rivers, cities, oceans, and the like. The computer system also identifies an altitude associated with the map view and compares the feature classes associated with the large zone entities to a prioritized list of feature classes for the altitude associated with the map view. The computer system may then assign the place context to be a selected one of the large zone entities that is associated with the highest priority feature class that is associated with one and only one large zone entity.

The step of assigning a place context to the map view may also include identifying a feature class on the prioritized list that has more than one associated large zone entity. In this case, the computer system determines a parent entity associated with each large zone entity within the feature class that has more than one associated large zone entity. If a common parent entity is associated with each large zone entity within the feature class that has more than one associated large zone entity, the computer system assigns the place context to be the common parent entity. The step of assigning a place context to the map view may also include assigning the place context to be a default entity, such as an ocean, a sea, or a continent, within the small zone if the process for assigning the place context exceeds a time-out period.

According to another aspect of the invention, the step of assigning a parent context to the map view may include defining a small zone within the map view and identifying small zone entities that are wholly or partially displayed within the small zone. If the place context is a small land feature and one and only one of the small zone entities is an administrative, or sub-national, unit, the computer system may assign the parent context to be the administrative unit. If the place context is a small land feature and one and only one of the small zone entities is a country, the computer system may assign the parent context to be the country. If the place context is a small land feature and one and only one of the small zone entities is a continent, the computer system may assign the parent context to be the continent.

Alternatively, if the place context is a country and one and only one of the small zone entities is a continent, the computer system may assign the parent context to be the continent. If the place context is a country and one and only one of the small zone entities is an ocean, the computer system may assign the parent context to be the ocean.

Similarly, if the place context is an administrative unit and one and only one of the small zone entities is a country, the computer system may assign the parent context to be the country. If the place context is an administrative unit and one and only one of the small zone entities is a continent, the computer system may assign the parent context to be the continent. If the place context is an administrative unit and one and only one of the small zone entities is an ocean, the computer system may assign the parent context to be the ocean.

The invention thus provides a method for automatically associating multimedia features with a map view "on the fly," which allows multimedia features to be associated with a map view that a user selects using a pan or zoom tool. That the invention improves over the drawbacks of the prior art multimedia atlas programs and accomplishes these advantages will become apparent from the following detailed description of the exemplary embodiments and the appended drawings and claims.

DETAILED DESCRIPTION OF THE PREFERRED EMBODIMENTS

Figure 1:
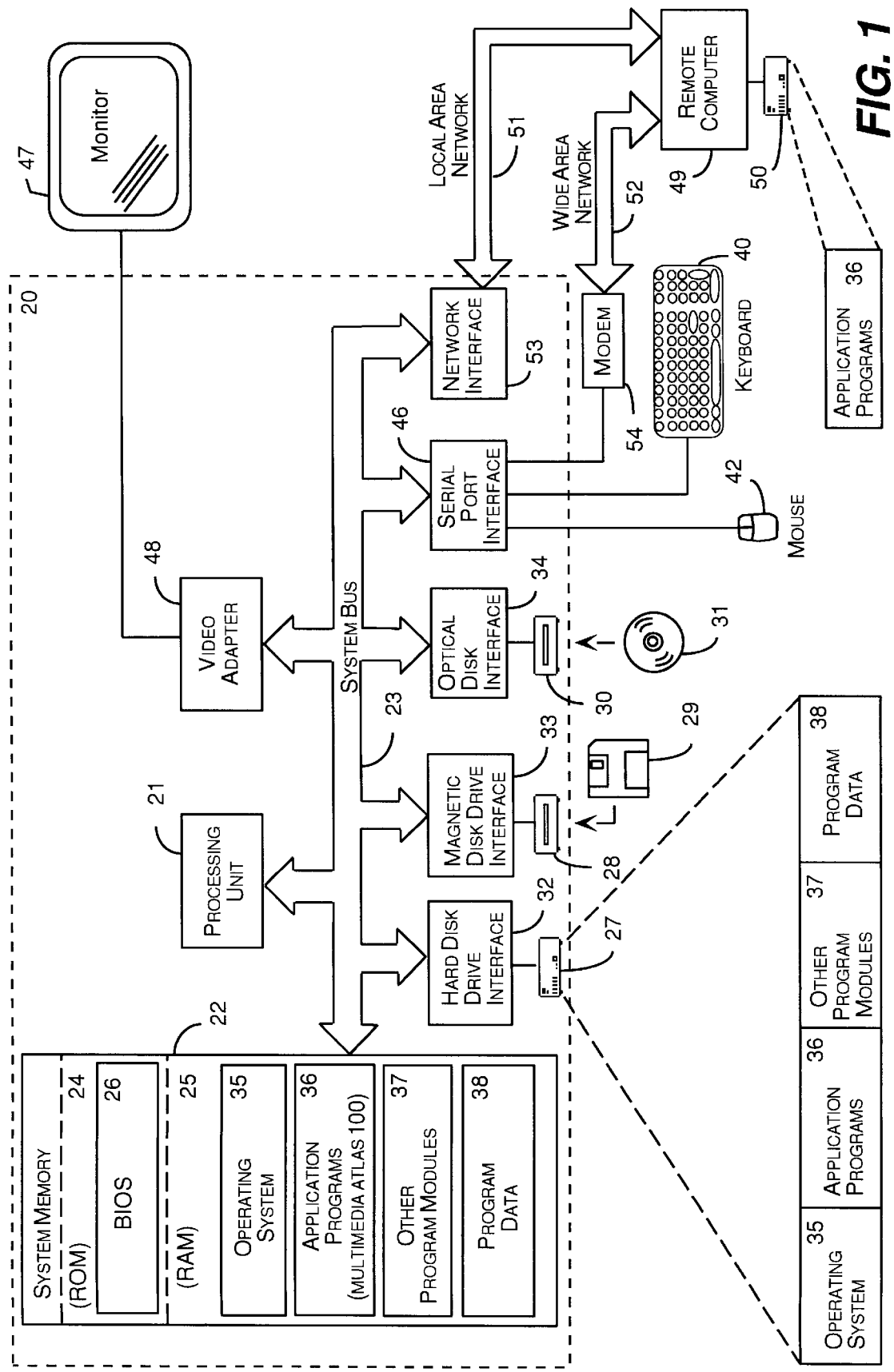
FIG. 1 is a functional block diagram of a personal computer system that provides the operating environment for the exemplary embodiments of the invention.

The present invention is a method for automatically assigning multimedia features to map views selected "on the fly" in a computer-based multimedia atlas program. The multimedia database includes a large number of multimedia features, such as videos, music, pictures, etc. that are tied to particular map entities in the atlas, such as continents, bodies of water, countries, regions, cities, mountain ranges, rivers, and so forth. The atlas program allows a user to pan and zoom over the globe so that the map views selected by the user are not necessarily the best-view map of any particular map entity.

To automatically assigning multimedia features to selected map views, the multimedia atlas program assigns a "place context" to a selected map view, which identifies and serves as the title of the selected map view. The place context is a particular map entity that has an associated set of multimedia features. Control items for selecting these multimedia features are then displayed for selection by the user. A "parent context" is also assigned to the selected map view. The user may select a parent context control item to cause the control items for selecting the multimedia features for the parent context to be displayed for selection by the user. Selecting the parent context control item may also change the map view to a best-view map of the parent entity.

To assign the place and parent context to a selected map view, the multimedia atlas program includes a finite state machine having the following states: about to draw, no context; about to draw, full context; draw started, full context; draw started, no context; about to draw, no context; draw ended, no context; draw ended, place context; and draw ended, full context. The multimedia atlas program applies a method for assigning a place context to the map that the user is viewing, which transitions from the "draw ended, no context" state to the "draw ended, place context" state. The multimedia atlas program also applies a method for assigning a parent context to the map that the user is viewing, which transitions from the "draw ended, place context" state to the "draw ended, full context" state.

The method for assigning a place context to the selected map view includes altitude thresholding for a predefined large-scale entity, typically "the world." This method also includes a routine for assigning a place context when the map the user is viewing is close enough to the best-view map of an entity in the atlas database. This method also includes and a routine for assigning a place context when the map the user is viewing includes a unique and interesting feature class. This unique and interesting feature class is typically selected from a prioritized list of feature classes that is based on the altitude of the selected map view. In addition, if the selected map view includes a non-unique but interesting feature class, a unique and interesting parent entity may be selected as the place context. A default place context may be assigned to the selected map view if the other attempts to assign the place context fail, or if the process for assigning the place context exceeds a time-out period.

The method for assigning a parent context to the selected map view includes routines for map views that have small land features, countries, administrative units, and islands or underwater features as the assigned place context. If the parent of the place context is a non-unique but interesting feature class, a unique and interesting parent may be selected as the parent context. Otherwise, a default patent context, such as "the world," is assigned to be the parent context for the selected map view.

Referring now to the drawings, in which like numerals indicate like elements throughout the several figures, the preferred embodiments of the invention will be described below with reference to the appended drawings. Generally, FIG. 1 illustrates the operating environment of an exemplary embodiment of the present invention.

Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both map entity and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. In particular, one of the other program modules 37 is a multimedia atlas program 100 that includes certain embodiments of the invention, which are described below with reference to FIGS. 2–14. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a map entity area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are incorporated into multimedia world atlas application programs known as ENCARTA97 WORLD ATLAS and ENCARTA VIRTUAL GLOBE, 1998 EDITION sold by Microsoft Corporation on CD-ROM for use with personal computer systems such as the illustrative personal computer 20. It will be appreciated that the principles of present invention are not limited to world atlas software, but could equivalently be applied to any computer-implemented system for rendering tiled or layered maps or diagrams of a larger subject. For example, it is anticipated that the present invention will be incorporated into future versions of Microsoft's multimedia atlas products and may also be incorporated into other products, such as trip planners, road atlas programs, astrological atlas programs, three-dimensional computer-aided design programs, and the like. It will further be appreciated that these exemplary application programs could equivalently be implemented on host computers other than personal computers, and could equivalently be transmitted to the host computer by means other that a CD-ROM, for example, by way of the network connection port 24.

Notwithstanding the broad applicability of the principles of the present invention described above, it should be understood that the configuration of the exemplary embodiment as a conventional CD-ROM for widely used personal computer systems provides significant advantages. In particular, the innovations described herein are specifically designed to produce acceptable performance of the multimedia world atlas application program 100, which is entirely contained on a conventional CD-ROM, when implemented on a conventional personal computer system 20. It will therefore be appreciated that the innovations described herein are well suited for use in connection with a high-latency mass-storage computer memory device such as a CD-ROM, DVD disk, network server, the Internet, or the like.

In so configuring the application program 100, certain trade-off balances, particularly between the often conflicting goals of reduced memory storage and increased processing speed, have necessarily been struck. It should be understood that variations of the trade-off balances struck in the exemplary embodiments described herein are within the spirit and scope of the present invention, particularly in view of the fact the inevitable improvements in computer hardware and memory storage devices will make other trade-off balances feasible.

Figure 2A:
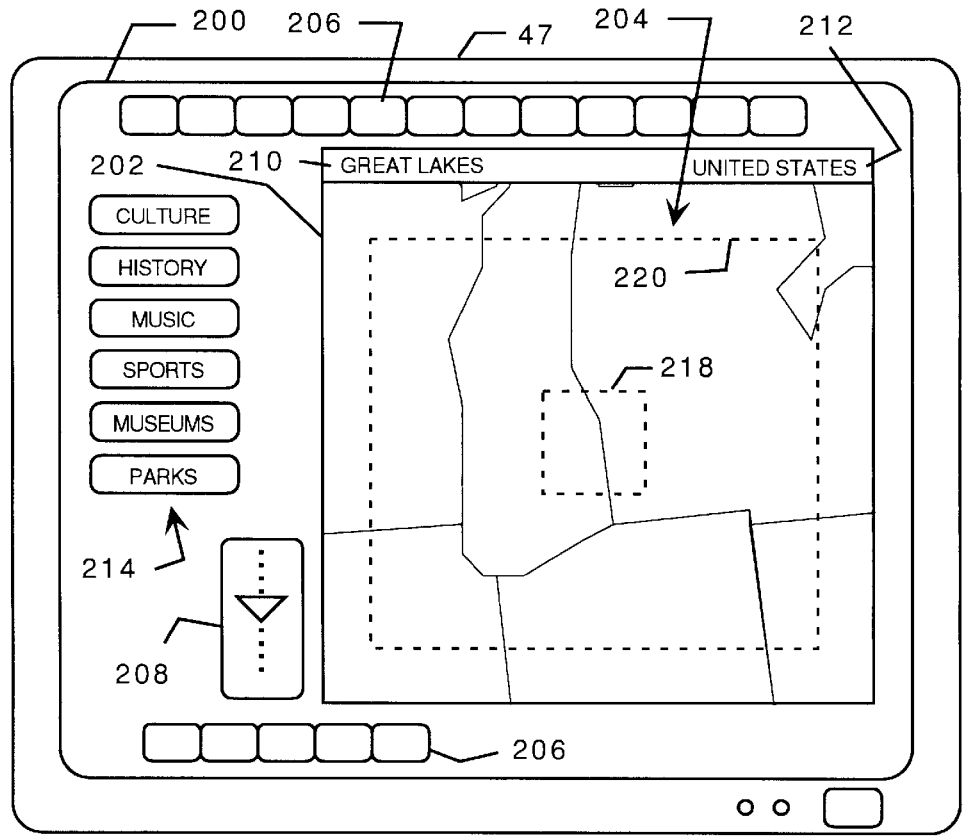
FIG. 2A illustrates a graphical user interface for a multimedia atlas program in accordance with an exemplary embodiment of the invention.
Figure 2B:
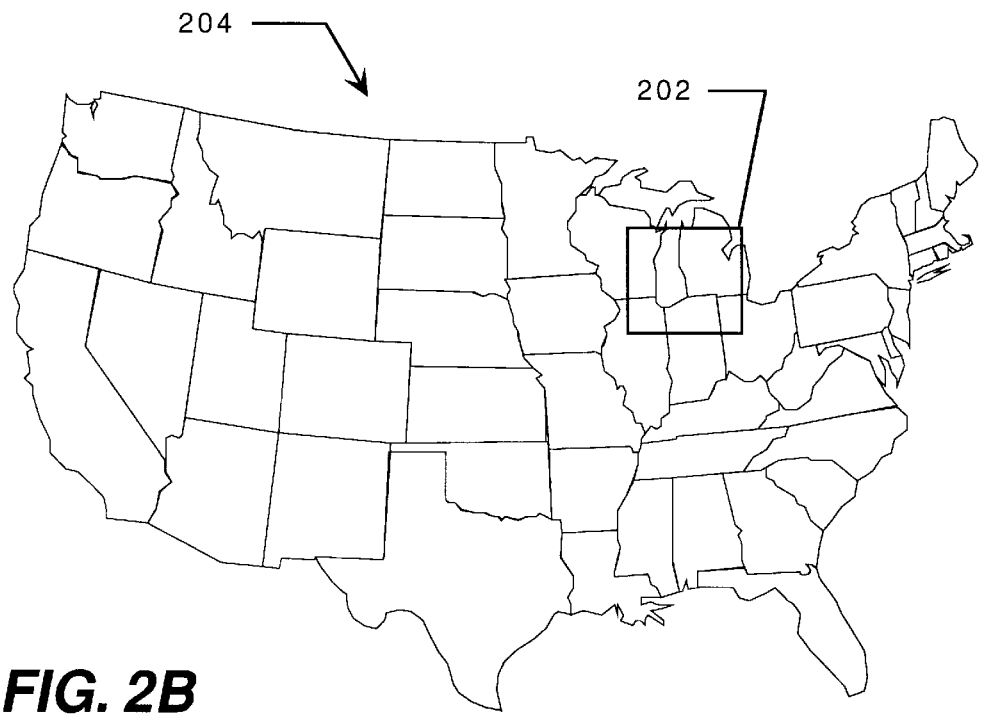
FIG. 2B illustrates a selected map view in the context of a larger map over which the graphical user interface of FIG. 2A may pan or zoom.

FIG. 2A illustrates an example of a graphical user interface 200 for the multimedia atlas program 100. FIG. 2B illustrates a selected map view 202 in the context of a global map 204 over which the graphical user interface 200 of FIG. 2A may pan and zoom. The graphical user interface 200 includes a number of tool-bar items 206 for operating the user interface. These tool-bar items may be selected to activate functionality of the multimedia atlas program 100 and may invoke one or more pull-down menus. For example, various tool-bar items activate atlas features known as "find," "help," "options," "map type," and so forth, as is familiar to those skilled in the art.

One of the tool-bar items 206 may be selected to invoke a zoom tool 208, which allows the user to alter the altitude of the selected map view 202. This allows the user to zoom over the global map 204 between about 150 km to 50,000 km above sea level. The zoom tool 208 thus allows the user to select map views ranging from individual cities to the entire globe. The user may also pan over the global map 204 to select map views, typically by moving the mouse pointer near the edge of the map view 202, which causes an arrow indicating the pan direction to be displayed. A panning sequence of map views is displayed while the user holds down the mouse button. To select a new map view 202, the user releases the mouse button, which causes the multimedia atlas program 100 to stop the panning sequence and render a detailed map of the selected map view.

Allowing the user to select a map view by panning or zooming may make it difficult to determine which set of the multimedia features to associate with a particular map view 202. To illustrate, consider a user who pans to the map view 202 showing a portion of the Great Lakes region, as shown in FIG. 2A. In response, the multimedia selection menu could display the multimedia control items associated with any or all of the map entities in that map view 202 that have associated multimedia features. For example, these map entities may include the World, North America, United States, Canada, Great Lakes region, Michigan, Wisconsin, Illinois, Indiana, Ohio, Lake Michigan, Chicago, Green Bay, etc. Since only a limited number of control items can be displayed at one time, it may not be possible to simultaneously display all of the control items associated with all of these map entities.

To solve this problem, the multimedia atlas program 100 assigns a place context 210 and a parent context 212 to the selected map view 202. Generally, the place context 210 identifies the map view 202 as a map of a particular locale, and the parent context 212 identifies the map view as a portion of a larger map. For the map view 202 shown in FIG. 2A, the place context 210 is the "Great Lakes" and the parent context 212 is the "United States." The place and parent context are a map entities that have associated multimedia features in the multimedia database. The multimedia control items 214 associated with the place context 210 are therefore displayed along with the selected map view 202. The user may then select among the control items 214, which causes the computer system 20 to perform the associated multimedia features.

The user may also select a control item for the parent context 212, typically by placing the mouse pointer on the parent context 212 and clicking the button on the mouse 42 or depressing the "enter" key on the keyboard 40. This selection causes the multimedia control items 214 to be replaced with the multimedia control items for the parent context 212. Selecting the control item for the parent context 212 may also cause the map view 202 to be replaced with the best-view map of the parent context.

The multimedia atlas program 100 thus provides a method for automatically associating the multimedia items 214 with the map view 202 "on the fly," which allows multimedia items to be associated with map views that a user selects using the pan or zoom tool. This aspect of the multimedia atlas program 100 provides advantages over prior art multimedia atlas programs, which only display multimedia control items after the user had select a best-view of a selected map entity using the "find" user interface tool.

Figure 3:
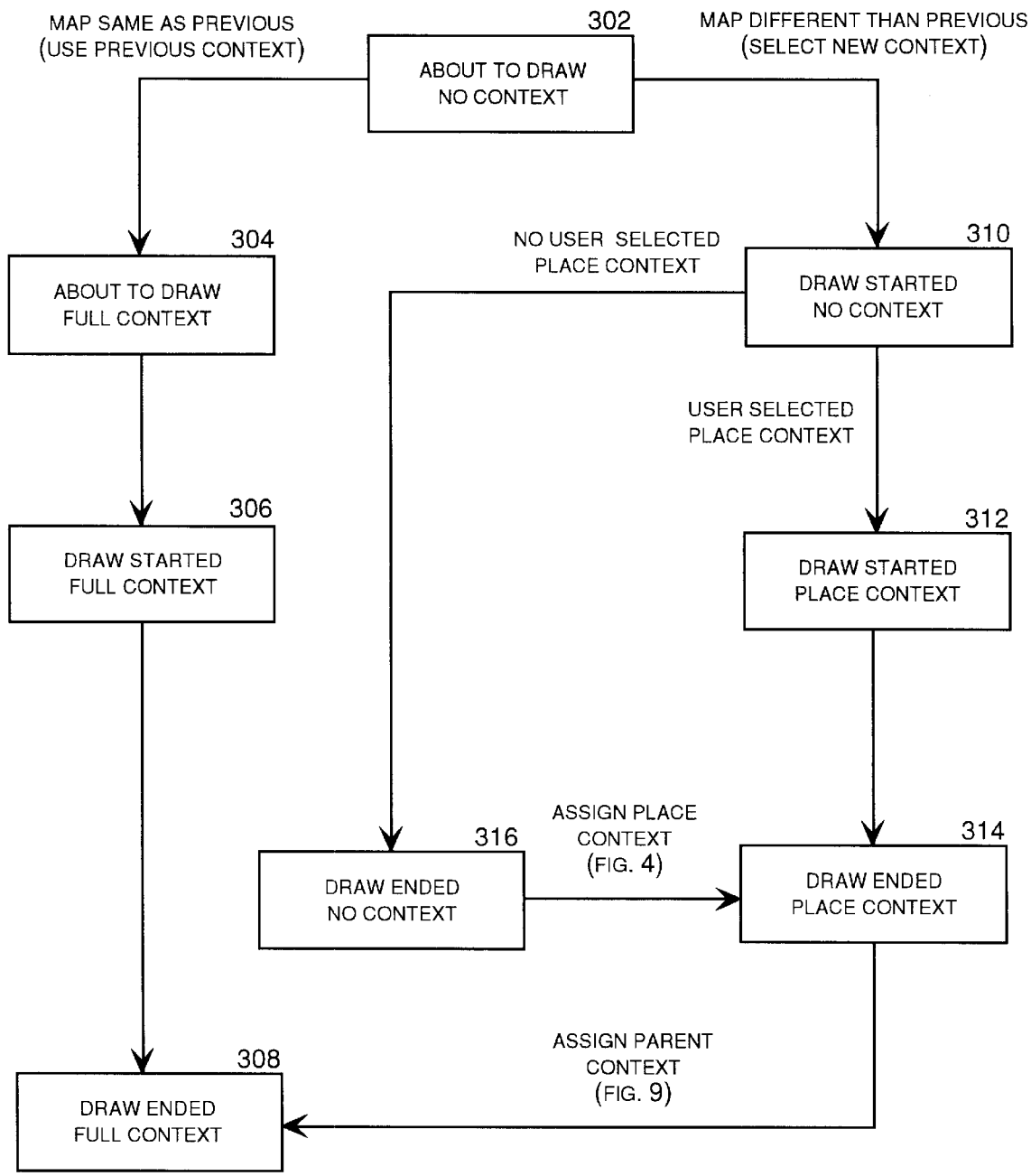
FIG. 3 is a state diagram illustrating a state machine for assigning a place and parent context to a selected map view in accordance with an exemplary embodiment of the invention.

FIG. 3 is a state diagram illustrating a state machine 300 for assigning the place context 210 and the parent context 212 to the selected map view 202. In state 302 (about to draw, no context), the multimedia atlas program 100 is about to render the map for the selected map view 202 and neither a place context 210 nor a parent context 212 has been assigned to the map view.

If the selected map view 202 is the same as the previously-displayed map view, then the previous place context 210 and parent context 212 are assigned to the selected map view 202. This transitions the state machine 300 from state 302 to state 304 (about to draw, full context), in which the multimedia atlas program 100 is about to render the map for the selected map view 202 and both a place context 210 and a parent context 212 have been assigned to the map view. The state machine 300 transitions from state 304 to state 306 (draw started, full context) when the drawing engine notifies the state machine that the draw has started. The state machine 300 then transitions from state 306 to state 308 (draw started, full context) when the drawing engine notifies the state machine that the draw has ended.

If the map view 202 is different then the previously-displayed map view, then the state machine 300 transitions from state 302 to state 310 (draw started, no context) when the drawing engine notifies the state machine that the draw has started. If the user has selected the place context 210 for the selected map view 202, typically using the "find" user interface tool, the state machine 300 assigns the user-selected place context to the map view. This transitions the state machine 300 from state 310 to state 312 (draw started, place context), in which the multimedia atlas program 100 has started rendering the map for the selected map view 202 and a place context 210, but not a parent context 212, has been assigned to the map view. The state machine 300 transitions from state 312 to state 314 (draw ended, place context) when the drawing engine notifies the state machine that the draw has ended.

If the user has not selected the place context 210 for the selected map view 202, typically by panning or zooming to the map view, the state machine 300 transitions from state 310 to state 316 (draw ended, no context) when the drawing engine notifies the state machine that the draw has ended. The multimedia atlas program 100 then assigns the place context 210 to the selected map view 202. This transitions the state machine 300 from state 316 to state 314 (draw ended, place context). From state 314, the multimedia atlas program 100 assigns the parent context 212 to the selected map view 202. This transitions the state machine 300 from state 314 to state 308 (draw ended, full context).

Thus, the steps that enable the multimedia atlas program 100 to assign the place context 210 and the parent context 212 to a map view 202 that has been selected using the pan or zoom tools occur during the transitions from state 316 to state 314 (assign place context), and from state 314 to state 308 (assign parent context). These aspects of the multimedia atlas program 100 are described below with reference to the logic flow diagrams illustrated in FIGS. 4–14. Specifically, FIGS. 4–8 describe the transition from 316 to state 314 (assign place context), and FIGS. 9–14 describe the transition from state 314 to state 308 (assign parent context).

Figure 4:
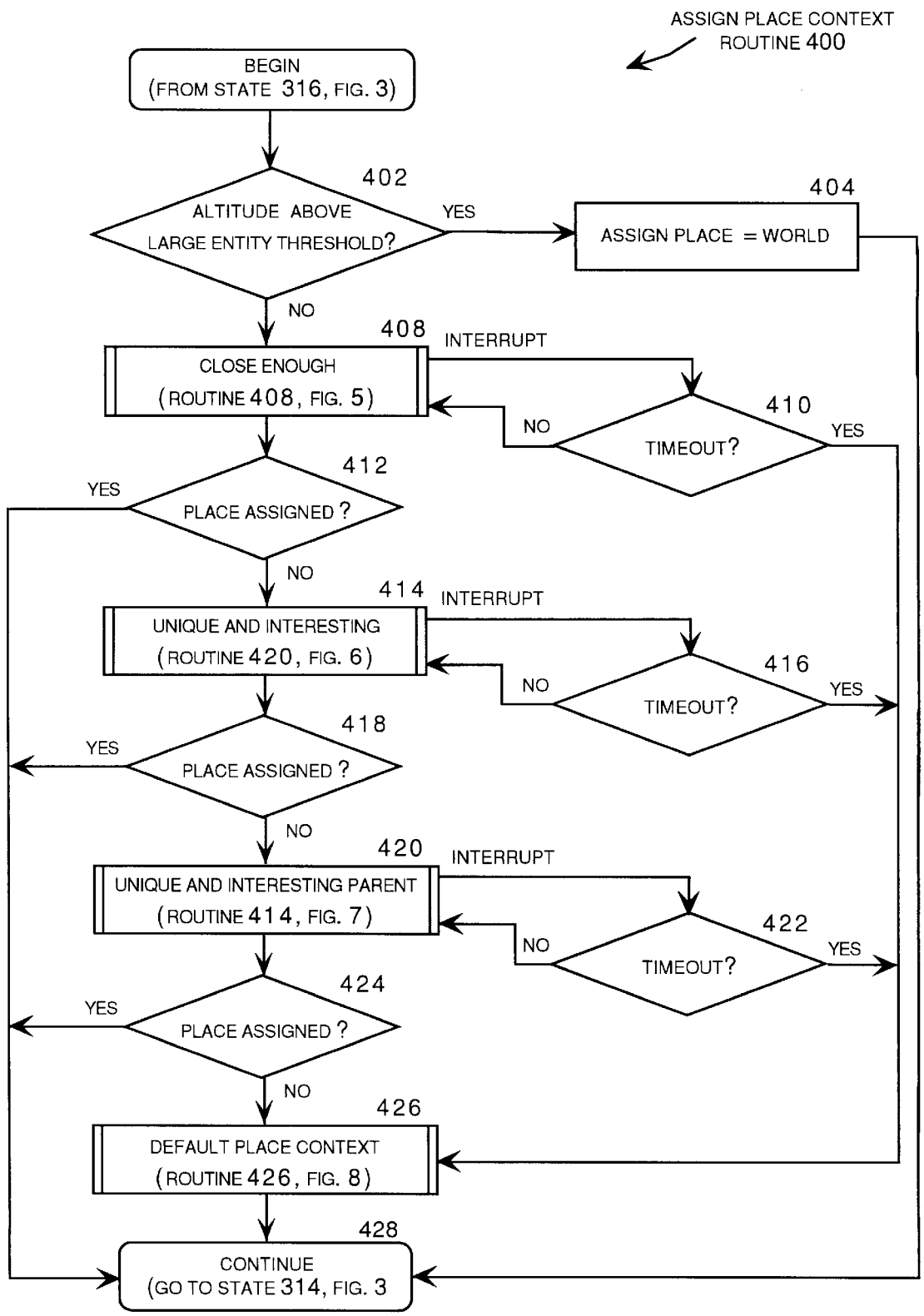
FIG. 4 is a logic flow diagram illustrating a routine for assigning a place context to a selected map view.

FIG. 4 is a logic flow diagram illustrating routine 400 for assigning the place context 210 to the selected map view 202. Routine 400, one way or another, assigns a place context 210 to the selected map view 202. Routine 400 begins at state 316 shown in FIG. 3. In step 402, the multimedia atlas program 100 determines whether the altitude of the selected map view 202 is above a predetermined large-scale threshold, such as 20,000 km above sea level. If the altitude of the selected map view 202 is above the large-scale threshold, the "YES" branch is followed to step 404, in which the multimedia atlas program 100 assigns the place context 210 to be a predefined large-scale context, such as "the world." Step 404 is followed by the continue step 428, which returns to state 314 shown in FIG. 3.

If the altitude of the selected map view 202 is not above the large-scale threshold, the "NO" branch is followed from step 402 to routine 408, in which the multimedia atlas program 100 determines whether the selected map view 202 corresponds closely enough to one of the predefined best-view maps associated with particular map entities. If the selected map view 202 does correspond closely enough to one of the predefined best-view maps, then the multimedia atlas program 100 assigns the place context 210 to be the map entity associated with the corresponding best-view map. Routine 408 is described with reference to FIG. 5.

The multimedia atlas program 100 keeps track of the amount of time expended attempting to assign the place context 210 to the selected map view 202. If the expended time exceeds a predetermined time-out period, such as two or three seconds, then processing is interrupted and a relatively fast default routine is employed to assign the place context 210. This time-out feature is represented by the "INTERRUPT" branch that extends from routine 408 to the decision block 410, in which the multimedia atlas program 100 determines whether the time-out period has been exceeded. If the time-out period has not been exceeded, the "NO" branch is followed back to routine 408, which continues processing. If the time-out period has been exceeded, the "YES" branch is followed to a default place context routine 426, which is described with reference to FIG. 8. It will be appreciated that the decision block 410 may represent a conventional timer-type interrupt, and that routine 408 need not loop continually between routine 408 and decision block 410 until the time-out period has been exceeded.

If the time-out period does not expire during routine 408, it may return having assigned a place context 210 to the selected map view 202, or it may return without having assigned a place context to the selected map view. That is, the selected map view 202 may or may not correspond closely enough to one of the predefined best-view maps. If routine 408 returns, the multimedia atlas program 100 determines in step 412 whether routine 408 assigned a place context 210 to the selected map view 202. If routine 408 assigned a place context 210 to the selected map view 202, the "YES" branch is followed to the continue step 428, which returns to state 314 shown in FIG. 3.

If routine 408 did not assign a place context 210 to the selected map view 202, the "NO" branch is followed from step 412 to routine 414, in which the multimedia atlas program 100 determines whether the selected map view 202 includes a map entity that is unique within an interesting feature class. Routine 414 is described with reference to FIG. 6. The time-out feature is represented by the "INTERRUPT" branch that extends from routine 414 to the decision block 416, in which the multimedia atlas program 100 determines whether the time-out period has been exceeded. If the time-out period has not been exceeded, the "NO"

branch is followed back to routine 414, which continues processing. If the time-out period has been exceeded, the "YES" branch is followed to the default place context routine 426.

If the time-out period does not expire during routine 414, it may return having assigned a place context 210 to the selected map view 202, or it may return without having assigned a place context to the selected map view. That is, the selected map view 202 may or may not include a map entity that is unique within an interesting feature class. If routine 414 returns, the multimedia atlas program 100 determines in step 418 whether routine 414 assigned a place context 210 to the selected map view 202. If routine 414 assigned a place context 210 to the selected map view 202, the "YES" branch is followed to the continue step 428, which returns to state 314 shown in FIG. 3.

If routine 414 did not assign a place context 210 to the selected map view 202, the "NO" branch is followed from step 418 to routine 420, in which the multimedia atlas program 100 determines whether the selected map view 202 includes a map entity that has an associated parent map entity that is unique within an interesting feature class. Routine 420 is described with reference to FIG. 7. The time-out feature is represented by the "INTERRUPT" branch that extends from routine 420 to the decision block 422, in which the which the multimedia atlas program 100 determines whether the time-out period has been exceeded. If the time-out period has not been exceeded, the "NO" branch is followed back to routine 420, which continues processing. If the time-out period has been exceeded, the "YES" branch is followed to the default place context routine 426.

If the time-out period does not expire during routine 420, it may return having assigned a place context 210 to the selected map view 202, or it may return without having assigned a place context to the selected map view. That is, the selected map view 202 may or may not include a map entity that has an associated parent map entity that is unique within an interesting feature class. If routine 420 returns, the multimedia atlas program 100 determines in step 424 whether routine 420 assigned a place context 210 to the selected map view 202. If routine 42 assigned a place context 210 to the selected map view 202, the "YES" branch is followed to the continue step 428, which returns to state 314 shown in FIG. 3.

If routine 420 did not assign a place context 210 to the selected map view 202, the "NO" branch is followed from step 418 to the default place context routine 426, which assigns a place context to the selected map view. Routine 426 is followed by the continue step 428, which returns to state 314 shown in FIG. 3.

Figure 5:
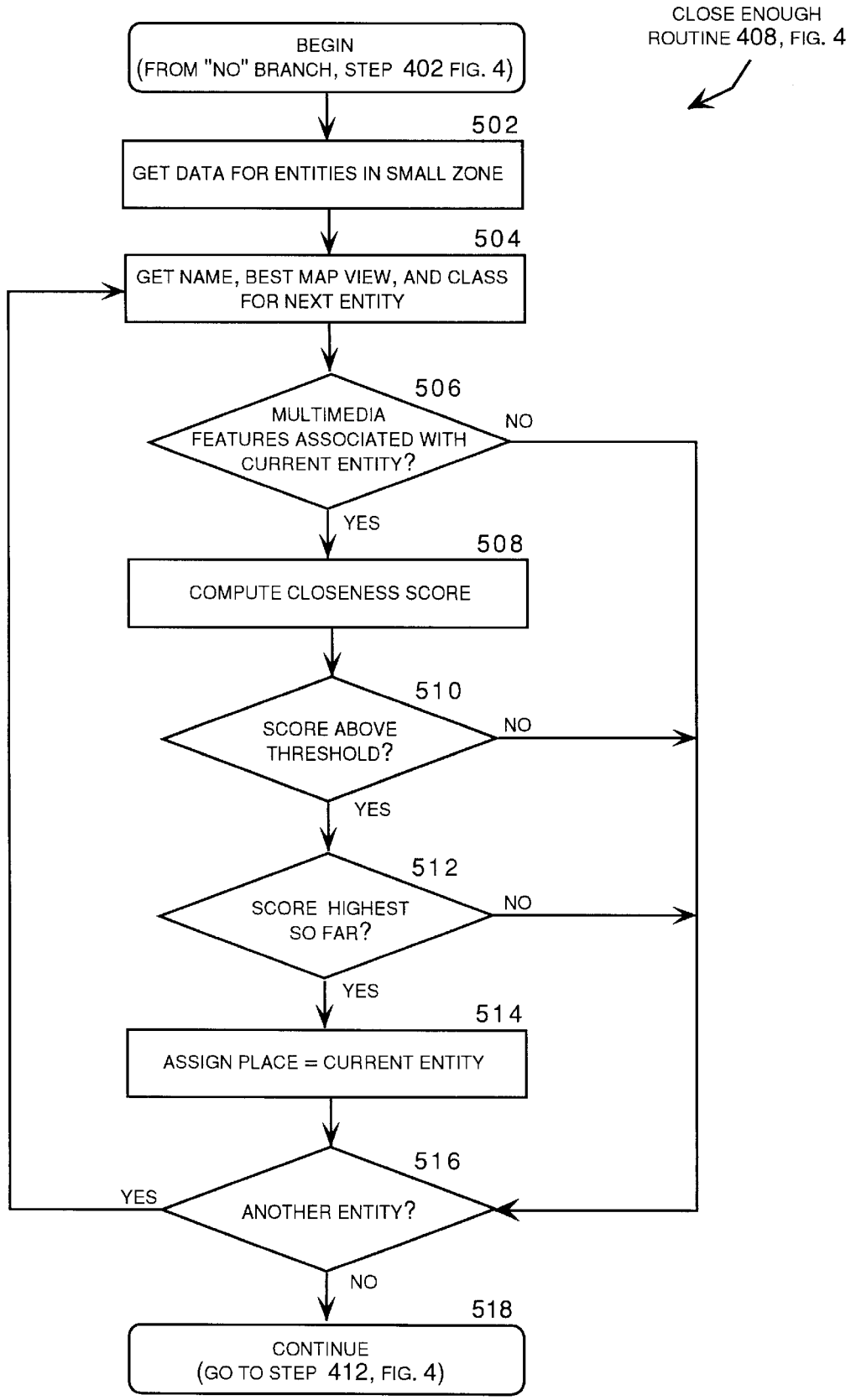
FIG. 5 is a logic flow diagram illustrating a routine for determining whether a selected map view corresponds to a predefined best-view map.

FIG. 5 is a logic flow diagram illustrating routine 408 for determining whether the selected map view 202 corresponds closely enough to one of the predefined best-view maps associated with one of the map entities. Routine 408 begins following the "NO" branch from step 402 shown in FIG. 4. In step 502, the multimedia atlas program 100 identifies the map entities that are present, in whole or in part, within a small zone 218 defined in the center of the selected map view 202. The size of the small zone 218, which is shown in FIG. 2, may be predefined or it may be a user-definable parameter. For example, in ENCARTA97 WORLD ATLAS the small zone 218 is predefined as one pixel, and in ENCARTA VIRTUAL GLOBE, 1998 EDITION the small zone 218 is predefined as five percent of the selected map view 202. Also in step 502, the multimedia atlas program 100 retrieves data for each map entity in the small zone 218, such as the name, best-view map, and associated feature class for each entity.

In step 504, the multimedia atlas program 100 gets the name, best-view map, and associated feature class for a particular map entity in the small zone 218, which will be referred to as the current map entity. In step 506, the multimedia atlas program 100 determines whether there are multimedia features associated with the current map entity. If there are no multimedia features associated with the current map entity, the "NO" branch is followed to step 516. If there are multimedia features associated with the current map entity, the "YES" branch is followed to step 508, in which the multimedia atlas program 100 computes a closeness score for the current map entity. A description of the computation of the closeness score follows the description of routine 408, which continues below.

In step 510, the multimedia atlas program 100 determines whether the closeness score for the current map entity is above a threshold closeness score. If the closeness score for the current map entity is above the threshold closeness score, the "NO" branch is followed to step 516. If the closeness score for the current map entity is above the threshold closeness score, the "YES" branch is followed to step 512, in which the multimedia atlas program 100 determines whether the closeness score for the current map entity is the highest closeness score so far. If the closeness score for the current map entity is not the highest closeness score so far, the "NO" branch is followed to step 516. If the closeness score for the current map entity is the highest closeness score so far, the "YES" branch is followed to step 514, in which the multimedia atlas program 100 assigns the place context 210 to be the current map entity.

Step 516 follows step 514, as well as the "NO" branches from steps 506, 510, and 512. In step 516, the multimedia atlas program 100 determines whether there is another map entity in the small zone 218. If there is another map entity in the small zone 218, the "YES" branch loops to step 504 and the next map entity is processed by routine 408. If there is not another map entity in the small zone 218, the "NO" branch is followed to the continue step 518, which returns to step 412 on FIG. 4. Thus, routine 408 processes every entity in the small zone 218 and assigns the place context 210 to be the map entity, if any, with the highest closeness score that is above the threshold closeness score.

The closeness score is based on the altitude and the position (e.g., x,y,z coordinate) of the selected map view 202 versus the altitude and the position of the best-view map of the current entity. An altitude score is computed as the absolute value of the ratio of the altitude of the selected map view 202 (alt map view) to the altitude of the best-view map of the current map entity (alt best-view), minus one. The altitude closeness score is then multiplied by a constant (k) to weight a current map view that is under the best-view map of the current map entity by a factor that is higher than the constant used to weight a current map view that is above the best-view map of the current map entity.

This differential weighting reflects the cartographic principle that a user that zooms in on a map entity is still intending to view that same map entity, whereas a user that zooms out on a map entity is intending to view that map entity in the context of a larger map view. Specifically, the constant (k) may be 0.2 if the current map view is under the best-view map of the current map entity, and the constant may be 1.75 if the current map view is above the best-view map of the current map entity. These specific parameters were selected by a group of cartographers who to experimented with different constants. The mathematical expression for the altitude score is:

altitude score=$k|(\text{alt map view}/\text{alt best-view})-1|$; $k$=0.2 or 1.75

A position score is computed based on the position of the center of the selected map view 202 ($X_m$, $Y_m$, $Z_m$) versus the position of the center of the best-view map of the current entity ($X_b$, $Y_b$, $Z_b$). The distance score is equal to the ratio of the sum of the absolute values of the difference in x, y, and z coordinates to the altitude of the selected map view 202. The mathematical expression for the position score is:

position score=$(|X_m-X_b|+|Y_m-Y_b|+|Z_m-Z_b|)/\text{alt map view}$

The altitude score is added to the distance score to obtain the closeness score. A threshold closeness score of 7.5 was selected by a group of cartographers who to experimented with different closeness scores.

Figure 6:
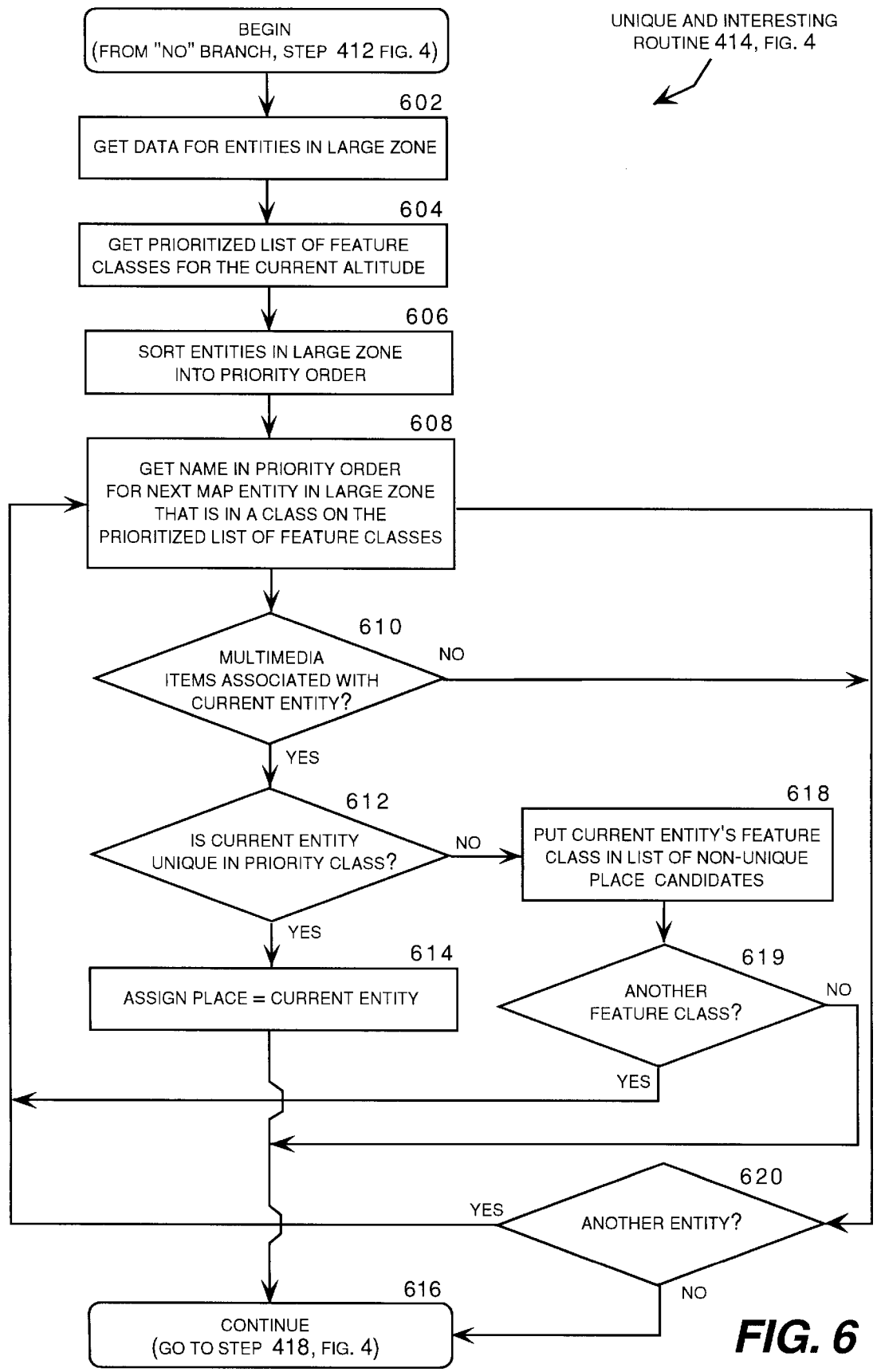
FIG. 6 is a logic flow diagram illustrating a routine for determining whether a map view includes a unique and interesting map entity.

FIG. 6 is a logic flow diagram illustrating routine 414 for determining whether the selected map view 202 includes a map entity that is unique within an interesting feature class. Routine 414 assigns the place context 210 to be the map entity in the large zone 220 that is unique within the highest priority feature class for the altitude of the current map view 202.

Routine 414 begins following the "NO" branch from step 412 shown in FIG. 4. In step 602, the multimedia atlas program 100 identifies the map entities that are present, in whole or in part, within a large zone 220 defined in the center of the selected map view 202. The size of the large zone 218, which is shown in FIG. 2, may be predefined or it may be a user-definable parameter. For example, in ENCARTA97 WORLD ATLAS the large zone 218 is predefined as the entire selected map view 202, and in ENCARTA VIRTUAL GLOBE, 1998 EDITION the large zone 218 is predefined as eighty percent of the selected map view 202. Also in step 602, the multimedia atlas program 100 retrieves data for each map entity in the large zone 218, such as a feature class associated with the map entity. A description of these feature classes follows the description of routine 414, which continues below.

In step 604, the multimedia atlas program 100 retrieves a prioritized list of feature classes for the altitude of the selected map view 202. Generally, the higher the altitude, the larger the map entities that are included in the prioritized list. In step 606, the multimedia atlas program 100 sorts the map entities in the large zone 220 in a priority order based on the prioritized list of feature classes for the altitude of the selected map view 202. In step 608, the multimedia atlas program 100 gets the name in priority order for the next map entity that is in a feature class that is in the prioritized list of feature classes for the altitude of the selected map view 202. This map entity will be referred to as the current map entity.

In step 610, the multimedia atlas program 100 determines whether there are multimedia features associated with the current map entity. If there are no multimedia features associated with the current map entity, the "NO" branch is followed to step 620, in which the multimedia atlas program 100 determines whether there is another map entity in the large zone 220 that is also in a feature class that is on the prioritized list of feature classes. If there is another map entity in the large zone 220 that is also in a feature class that is on the prioritized list of feature classes, the "YES" branch loops from step 620 to step 608, and the next map entity is processed in priority order. If there is not another map entity in the large zone 220 that is also in a feature class that is on the prioritized list of feature classes, the "NO" branch is followed to the continue step 616, which returns to step 418 shown in FIG. 4.

Referring again to step 610, if there are multimedia features associated with the current map entity, the "YES" branch is followed to step 612, in which the multimedia atlas program 100 determines whether the current map entity is unique within its feature class. That is, the multimedia atlas program 100 determines whether the current map entity is the only map entity in the large zone 220 that is associated with its particular feature class. If the current map entity is unique within its feature class, the "YES" branch is followed to step 614, in which the multimedia atlas program 100 assigns the place context 210 to be the current map entity. Step 614 is followed by the continue step 616, which returns to step 418 shown in FIG. 4.

Referring again to step 612, if the current map entity is not unique within its feature class, the "NO" branch is followed from step 612 to step 618, in which the current map entity's feature class is placed in a list of non-unique place candidates. Further use of list of non-unique place candidates is described with reference to routine 420 shown on FIG. 7.

Step 618 is followed by step 619, in which the multimedia atlas program 100 determines whether there is another feature class represented by the map entities in the large zone 220 that is also a feature class that is on the prioritized list of feature classes. If there is another feature class represented by the map entities in the large zone 220 that is also a feature class that is on the prioritized list of feature classes, the "YES" branch loops from step 619 to step 608, and the map entity for the next feature class is processed in priority order. If there is not another feature class represented by the map entities in the large zone 220 that is also a feature class that is on the prioritized list of feature classes, the "NO" branch is followed to the continue step 616, which returns to step 418 shown in FIG. 4.

A feature class is group heading for a number of similar map entities. Each map entity is included in one and only one feature class. For example, the following is an exemplary list of feature classes:

| Administrative Unit | City | Continent |
|---|---|---|
| Country or Dependency | Major City | Oceans and Seas |
| Special Point of Interest | Random Place | Transportation |
| Time Zone | Islands | Major Airport |
| Minor City | Town | Major Capital City |
| Minor Capital City | Capital City | Capital Town |
| World | Underwater Feature | Mountain Feature |
| Landscape Feature | Oceanic Water Feature | Other Water Feature |
| Metropolitan Area | Major Admin. Capital | City Admin. Capital |
| Minor Admin. Capital | Town Admin. Capital | Disputed Area |

Typical prioritized lists of feature classes an for an exemplary set of altitude classifications are:

Low altitude (e.g., 400 km or less above sea level):

City Classes,

Administrative Units

Countries,

Ocean Classes

Mid altitude (between 400 km & 10,000 km above sea level)

Big City Classes,

Administrative Units,

Countries,

Continents,

Ocean Classes

High altitude (over 10,000 km above sea level)

Countries,
Continents,
Ocean Classes

City Classes include the following feature classes:

| | |
|---|---|
| City | Major City |
| Minor City | Town |
| Major Capital City | Minor Capital City |
| Capital City | Capital Town |
| Metro Area | Major City Admin. Capital |
| City Admin. Capital | Minor City Admin. Capital |
| Town Admin. Capital | |

Big City Classes include the following feature classes:

| | |
|---|---|
| City | Major City |
| Minor City | Major Capital City |
| Minor Capital City | Capital City |
| Capital Town | Major City Admin. Capital |
| City Adinin. Capital | Minor City Admin. Capital |
| Town Admin. Capital | |

Ocean Classes include the following feature classes:
Oceans and Seas
Other Water Feature Small land features include the following feature classes:

| | |
|---|---|
| City | Major City |
| Special Point of Interest | Random Place |
| Major Airport | Minor City |
| Town | Major Capital City |
| Minor Capital City | Capital City |
| Capital Town | Mountain Feature |
| Landscape Feature | Other Water Feature |
| Metropolitan Area | Major City - Admin. Capital |
| Minor City - Admin. Capital | |
| Town - Admin. Capital | |

Figure 7:
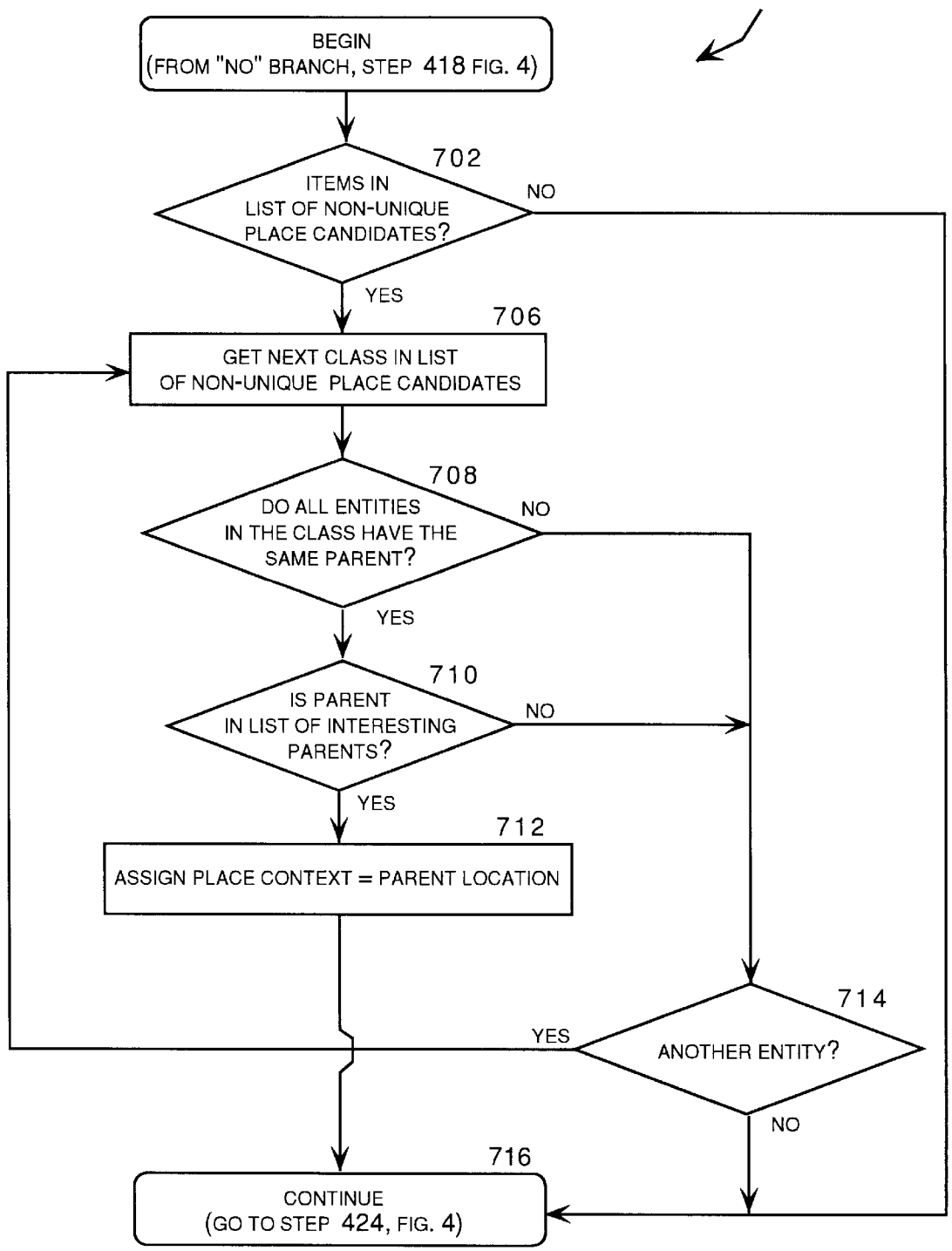
FIG. 7 is a logic flow diagram illustrating a routine for determining whether a map view includes a map entity with a unique and interesting parent.

FIG. 7 is a logic flow diagram illustrating routine 420 for determining whether the selected map view 202 includes a map entity that is associated with a unique and interesting parent map entity. To strike a balance between memory requirements and processing speed, some, but not all, of the map entities are associated with predefined parent entities, which are referred to as interesting parent map entities. Map entities are linked to their interesting parent map entities in a politically or geologically significant way. For example, the United States is the interesting parent entity associated with each of the 50 states; Europe is the interesting parent entity associated with each of the European countries, and so forth. The list of interesting parent entities, which typically numbers in the thousands, is limited to entities that have associated multimedia features and may be further limited based on the advice of cartographers who have experimented with the multimedia atlas program 100.

Routine 420 begins following the "NO" branch from step 702 shown on FIG. 4. In step 702, the multimedia atlas program 100 determines whether there are map entities in the list of non-unique place candidates. Non-unique place candidates are map entities that have associated multimedia features, and that are in a feature class that is in the prioritized list of feature classes for the altitude of the selected map view 202, but are not unique within their feature class. That is, more than one map entity in the large zone 220 has associated multimedia features, is in this particular feature class, and this particular feature class is in the prioritized list of feature classes for the altitude of the selected map view 202.

If there no map entities in the list of non-unique place candidates, the "NO" branch is followed to the continue step 716, which returns to step 424 shown on FIG. 4. If there are map entities in the list of non-unique place candidates, the "YES" branch is followed to step 706, in which the multimedia atlas program 100 gets a particular feature class that is associated with a map entity in the list of non-unique place candidates, which will be referred to as the current feature class. In step 708, the multimedia atlas program 100 determines whether all of the map entities in the list of non-unique place candidates and in the current feature class have the same associated parent entity.

If all of the map entities in the list of non-unique place candidates and in the current feature class have the same associated parent entity, the "YES" branch is followed to step 710, in which the multimedia atlas program 100 determines whether this parent entity is in a list of interesting parent entities. If the parent entity is in the list of interesting parent entities, the "YES" branch is followed to step 712, in which the multimedia atlas program 100 assigns the place context 210 to be the parent entity. Step 712 is followed by the continue step 716, which returns to step 424 shown in FIG. 4.

If all of the map entities in the list of non-unique place candidates and in the current feature class do not have the same associated parent entity, the "NO" branch is followed from step 708 to step 714, in which the multimedia atlas program 100 determines whether there is another map entity in the list of non-unique place candidates. If the parent entity is not in the list of interesting parent entities, the "NO" branch is followed from step 710 to step 714. If there is another map entity in the list of non-unique place candidates, the "YES" branch loops from step 714 to step 706, and the next map entity in the list of non-unique place candidates is processed. If there is not another map entity in the list of non-unique place candidates, the "NO" branch is followed to the continue step 616, which returns to step 424 shown in FIG. 4.

Figure 8:
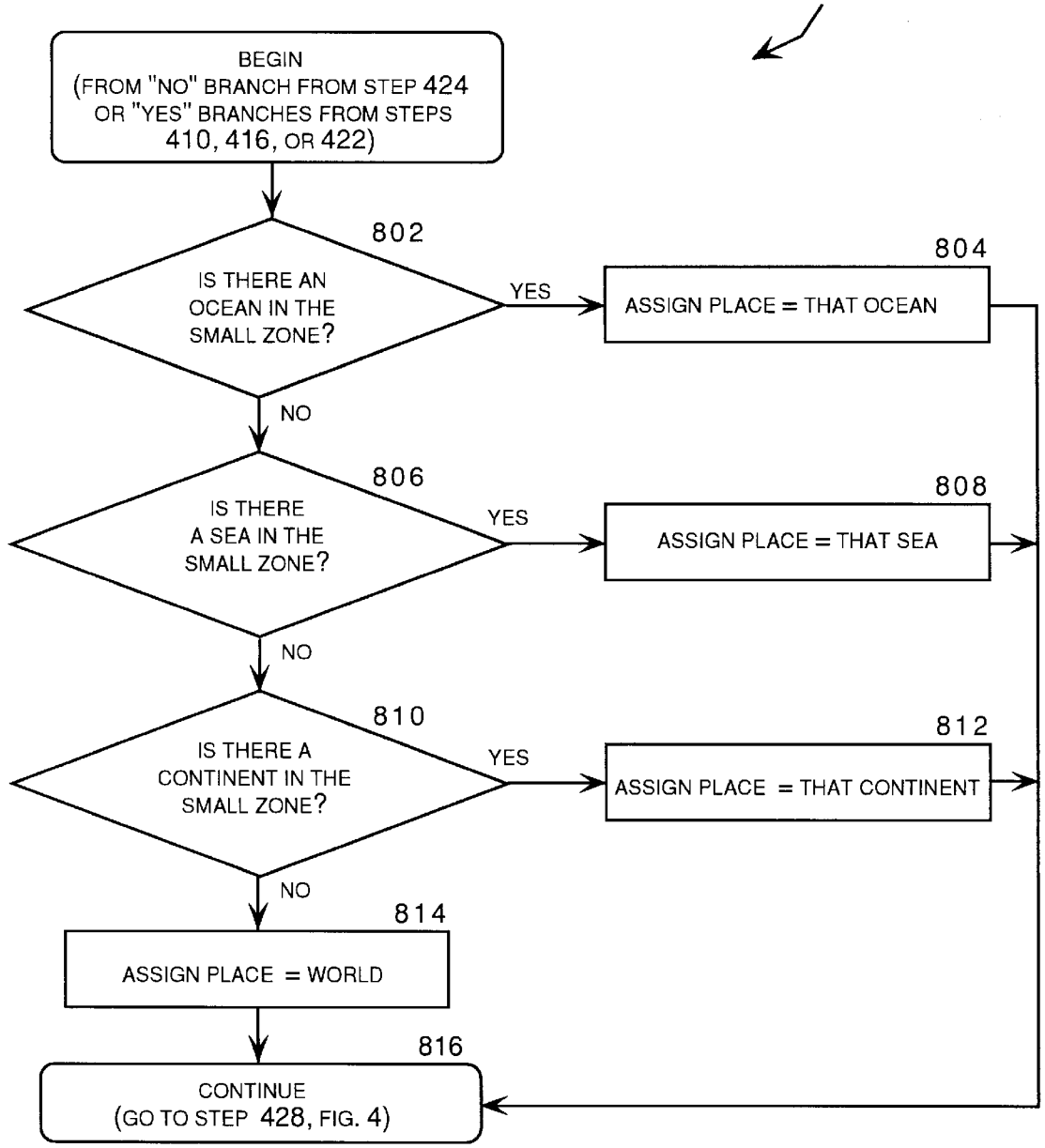
FIG. 8 is a logic flow diagram illustrating a routine for assigning a default place context to a selected map view.

FIG. 8 is a logic flow diagram illustrating the default routine 426 for assigning the place context 210 to the selected map view 202. The default routine is employed if the time-out period expires before the place context 210 is assigned, or if the routines 408, 414, and 420 all return without having assigned the place context 210. Thus, routine 426 may follow the "NO" branch from step 424 or the "YES" branches from the time-out interrupt blocks 410, 416, or 422.

In step 802, the multimedia atlas program 100 determines whether there is an ocean in the small zone 218. If there is an ocean in the small zone 218, the "YES" branch is followed to step 804, in which the multimedia atlas program 100 assigns the place context 210 to be that ocean.

If there is not an ocean in the small zone 218, the "NO" branch is followed to step 806, in which the multimedia atlas program 100 determines whether there is a sea in the small zone 218. If there is a sea in the small zone 218, the "YES" branch is followed to step 808, in which the multimedia atlas program 100 assigns the place context 210 to be that sea.

If there is not a sea in the small zone 218, the "NO" branch is followed to step 810, in which the multimedia atlas program 100 determines whether there is a continent in the small zone 218. If there is a continent in the small zone 218, the "YES" branch is followed to step 812, in which the multimedia atlas program 100 assigns the place context 210 to be that continent.

If there is not a continent in the small zone 218, the "NO" branch is followed to step 814, in which the multimedia atlas program 100 assigns the place context 210 to be "the world." Steps 804, 808, 812, and 814 are followed by the continue step 816, which returns to step 428 shown in FIG. 4.

Figure 9:
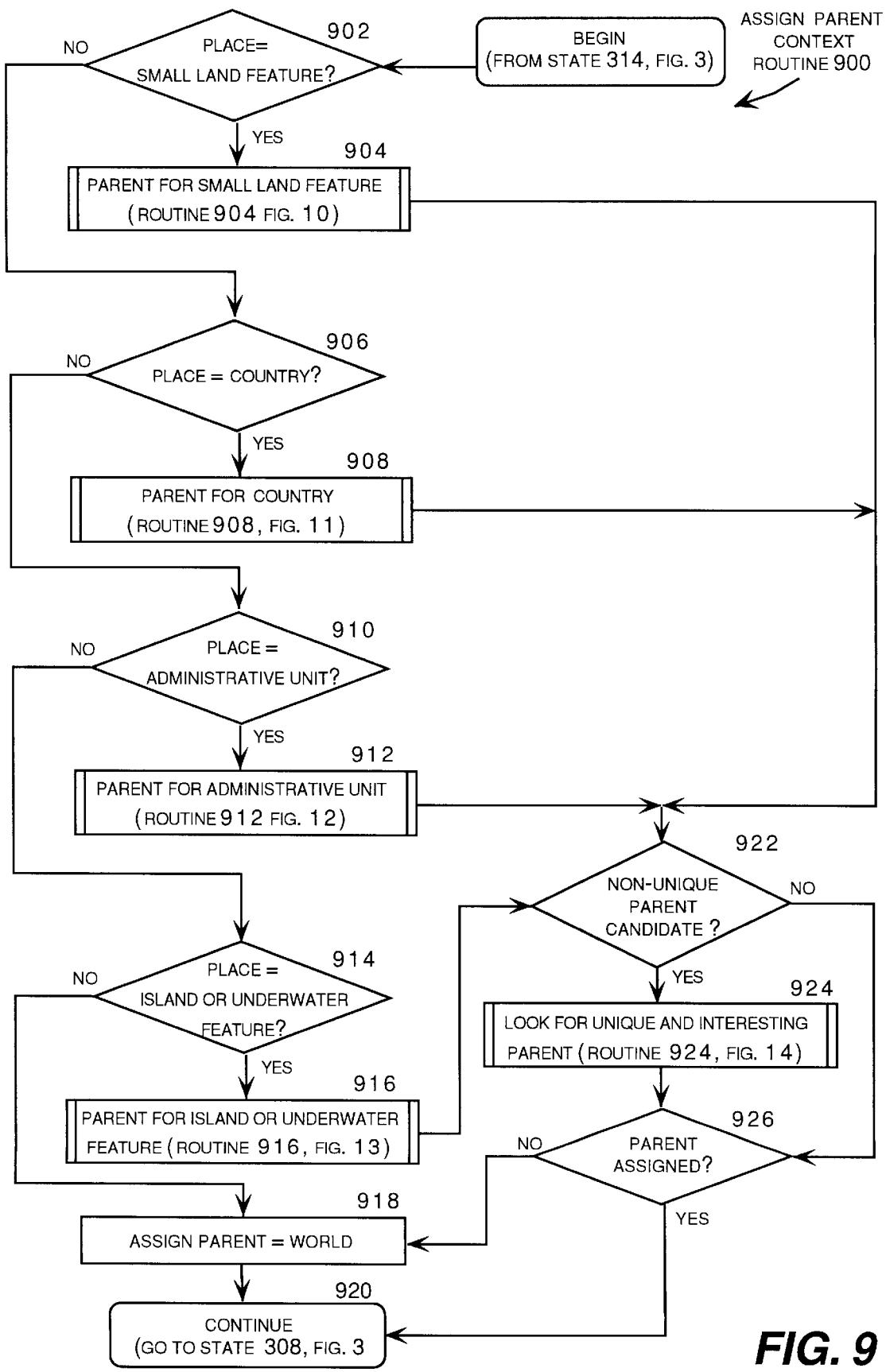
FIG. 9 is a logic flow diagram illustrating a routine for assigning a parent context to a selected map view.

FIG. 9 is a logic flow diagram illustrating routine 900 for assigning a parent context to the selected map view 202. Routine 900, one way or another, assigns a parent context 212 to the selected map view 202. Routine 900 begins at state 314 shown of FIG. 3. In step 902, the multimedia atlas program 100 determines whether the place context 210 is a small land feature.

If the place context 210 is a small land feature, the "YES" branch is followed to routine 904, which is a routine specifically for assigning the parent context 212 to a map view that has a small land feature assigned as its place context 210. Routine 904 is described with reference to FIG. 10. If the place context 210 is not a small land feature, the "NO" branch is followed to step 906, in which the multimedia atlas program 100 determines whether the place context 210 is a country.

If the place context 210 is a country, the "YES" branch is followed to routine 908, which is a routine specifically for assigning the parent context 212 to a map view that has a country assigned as its place context 210. Routine 908 is described with reference to FIG. 11. If the place context 210 is not a country, the "NO" branch is followed to step 910, in which the multimedia atlas program 100 determines whether the place context 210 is an administrative unit.

If the place context 210 is an administrative unit, the "YES" branch is followed to routine 912, which is a routine specifically for assigning the parent context 212 to a map view that has an administrative unit assigned as its place context 210. Routine 912 is described with reference to FIG. 12. If the place context 210 is not an administrative unit, the "NO" branch is followed to step 914, in which the multimedia atlas program 100 determines whether the place context 210 is an island or underwater feature.

If the place context 210 is an island or underwater feature, the "YES" branch is followed to routine 916, which is a routine specifically for assigning the parent context 212 to a map view that has an island or underwater feature assigned as its place context 210. Routine 916 is described with reference to FIG. 13. If the place context 210 is not an island or underwater feature, the "NO" branch is followed to step 918, in which the multimedia atlas program 100 assigns the parent context 212 to be "the world." Step 918 is followed by the continue step 920, which returns to state 308 shown on FIG. 3.

Figure 10:
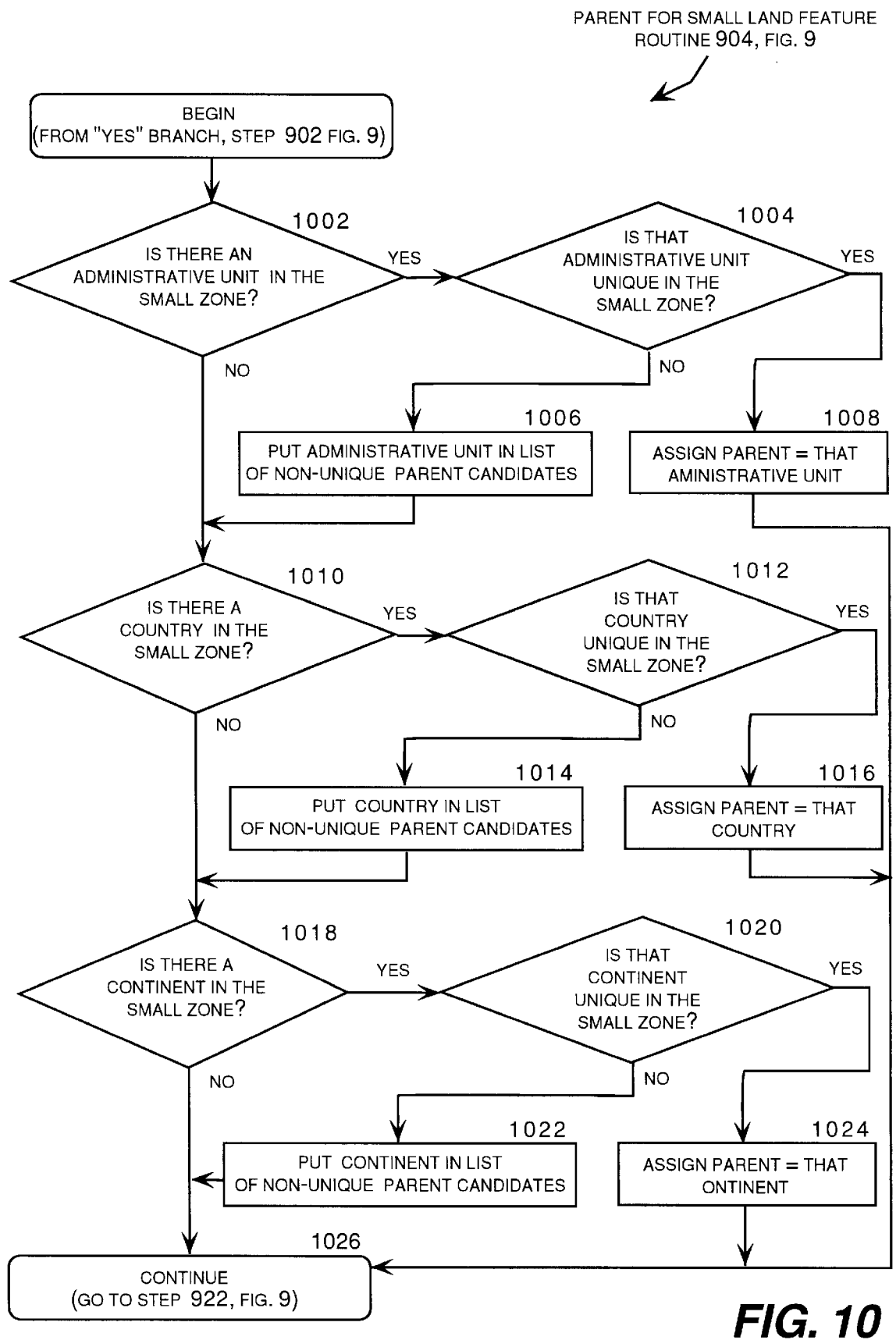
FIG. 10 is a logic flow diagram illustrating a routine for assigning a parent context to a map view that has a small land feature assigned as its place context.

FIG. 10 is a logic flow diagram illustrating routine 904 for assigning the parent context 212 to a map view that has a small land feature assigned as its place context 210. Routine 902 follows the "YES" branch from step 902 shown on FIG. 9. In step 1002, the multimedia atlas program 100 determines whether there is an administrative unit in the small zone 218. If there is an administrative unit in the small zone 218, the "YES" branch is followed to step 1004, in which the multimedia atlas program 100 determines whether the administrative unit is unique within the small zone 218. That is, the multimedia atlas program 100 determines whether the current administrative unit is the only entity in the administrative unit feature class that is located in whole or in part in the small zone 218.

If the administrative unit is not unique within the small zone 218, the "NO" branch is followed to step 1006, in which the multimedia atlas program 100 places the administrative unit in the list of non-unique parent candidates. This list of non-unique parent candidates is used in routine 924, which is described with reference to FIG. 14. If the administrative unit is unique within the small zone 218, the "YES" branch is followed to step 1008, in which the multimedia atlas program 100 assigns the administrative unit to be the parent context 212. Step 1008 is followed by the continue step 1026, which returns to step 922 shown on FIG. 9.

Step 1006 is followed by step 1010, in which the multimedia atlas program 100 determines whether there is a country in the small zone 218. If there is a country in the small zone 218, the "YES" branch is followed to step 1012, in which the multimedia atlas program 100 determines whether the country is unique within the small zone 218. If the country is not unique within the small zone 218, the "NO" branch is followed to step 1014, in which the multimedia atlas program 100 places the country in the list of non-unique parent candidates. If the country is unique within the small zone 218, the "YES" branch is followed to step 1016, in which the multimedia atlas program 100 assigns the country to be the parent context 212. Step 1016 is followed by the continue step 1026.

Step 1014 is followed by step 1018, in which the multimedia atlas program 100 determines whether there is a continent in the small zone 218. If there is a continent in the small zone 218, the "YES" branch is followed to step 1020, in which the multimedia atlas program 100 determines whether the continent is unique within the small zone 218. If the continent is not unique within the small zone 218, the "NO" branch is followed to step 1022, in which the multimedia atlas program 100 places the continent in the list of non-unique parent candidates. If the continent is unique within the small zone 218, the "YES" branch is followed to step 1024, in which the multimedia atlas program 100 assigns the continent to be the parent context 212. Steps 1022 and 1024 are followed by the continue step 1026.

Figure 11:
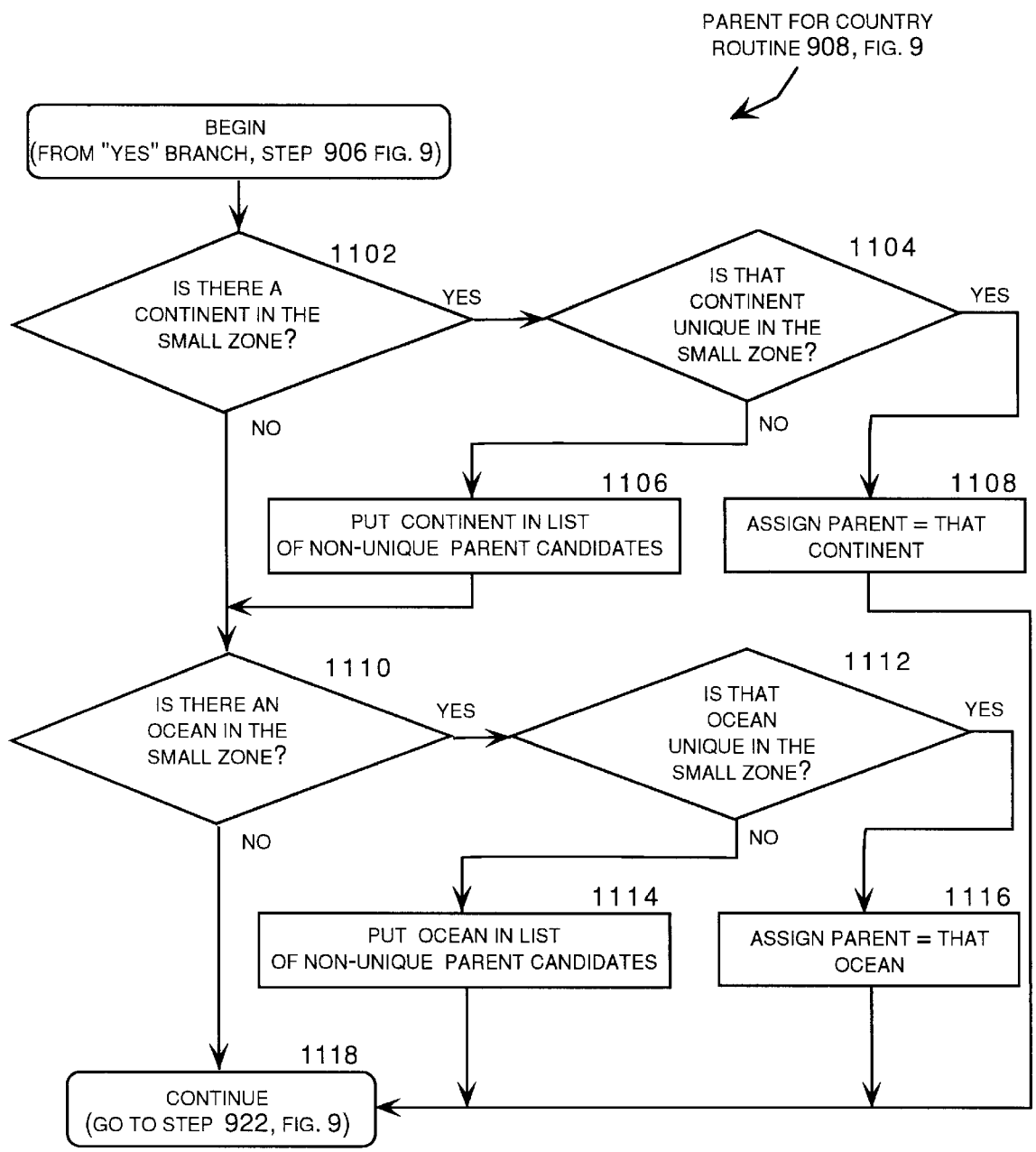
FIG. 11 is a logic flow diagram illustrating a routine for assigning a parent context to a map view that has a country assigned as its place context.

FIG. 11 is a logic flow diagram illustrating routine 908 for assigning the parent context 212 to a map view that has a country assigned as its place context 210. Routine 908 follows the "YES" branch from step 906 shown on FIG. 9. In step 1102, the multimedia atlas program 100 determines whether there is a continent in the small zone 218. If there is a continent in the small zone 218, the "YES" branch is followed to step 1104, in which the multimedia atlas program 100 determines whether the continent is unique within the small zone 218. If the continent is not unique within the small zone 218, the "NO" branch is followed to step 1106, in which the multimedia atlas program 100 places the continent in the list of non-unique parent candidates. If the continent is unique within the small zone 218, the "YES" branch is followed to step 1108, in which the multimedia atlas program 100 assigns the continent to be the parent context 212. Step 1108 is followed by the continue step 1118, which returns to step 922 shown on FIG. 9.

Step 1106 is followed by step 1110, in which the multimedia atlas program 100 determines whether there is an ocean in the small zone 218. If there is an ocean in the small zone 218, the "YES" branch is followed to step 1112, in which the multimedia atlas program 100 determines whether the ocean is unique within the small zone 218. If the ocean is not unique within the small zone 218, the "NO" branch is followed to step 1114, in which the multimedia atlas program 100 places the ocean in the list of non-unique parent candidates. If the ocean is unique within the small zone 218, the "YES" branch is followed to step 1116, in which the multimedia atlas program 100 assigns the ocean to be the parent context 212. Steps 1114 and 1116 are followed by the continue step 1118.

Figure 12:
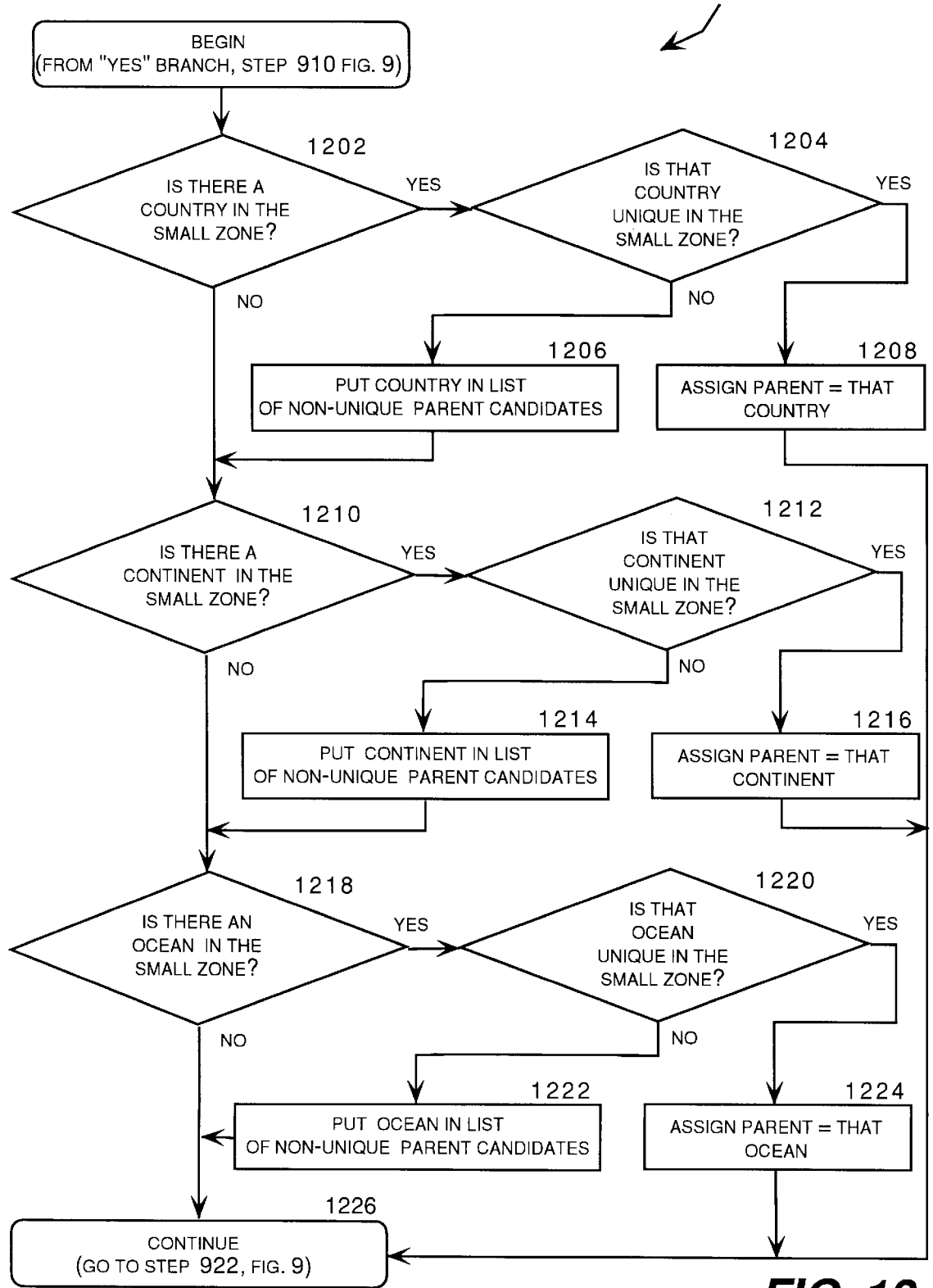
FIG. 12 is a logic flow diagram illustrating a routine for assigning a parent context to a map view that has an administrative unit assigned as its place context.

FIG. 12 is a logic flow diagram illustrating routine for 912 for assigning the parent context 212 to a map view that has an administrative unit assigned as its place context 210. Routine 912 follows the "YES" branch from step 910 shown on FIG. 9. In step 1202, the multimedia atlas program 100 determines whether there is a country in the small zone 218. If there is a country in the small zone 218, the "YES" branch is followed to step 1204, in which the multimedia atlas program 100 determines whether the country is unique within the small zone 218. If the country is not unique within the small zone 218, the "NO" branch is followed to step 1206, in which the multimedia atlas program 100 places the country in the list of non-unique parent candidates. If the country is unique within the small zone 218, the "YES" branch is followed to step 1208, in which the multimedia atlas program 100 assigns the country to be the parent context 212. Step 1208 is followed by the continue step 1226, which returns to step 922 shown in FIG. 9.

Step 1206 is followed by step 1210, in which the multimedia atlas program 100 determines whether there is a continent in the small zone 218. If there is a continent in the small zone 218, the "YES" branch is followed to step 1212, in which the multimedia atlas program 100 determines whether the continent is unique within the small zone 218. If the continent is not unique within the small zone 218, the "NO" branch is followed to step 1214, in which the multimedia atlas program 100 places the continent in the list of non-unique parent candidates. If the continent is unique within the small zone 218, the "YES" branch is followed to step 1216, in which the multimedia atlas program 100 assigns the continent to be the parent context 212. Step 1116 is followed by the continue step 1226.

Step 1214 is followed by step 1218, in which the multimedia atlas program 100 determines whether there is an ocean in the small zone 218. If there is an ocean in the small zone 218, the "YES" branch is followed to step 1220, in which the multimedia atlas program 100 determines whether the ocean is unique within the small zone 218. If the ocean is not unique within the small zone 218, the "NO" branch is followed to step 1222, in which the multimedia atlas program 100 places the ocean in the list of non-unique parent candidates. If the ocean is unique within the small zone 218, the "YES" branch is followed to step 1224, in which the multimedia atlas program 100 assigns the ocean to be the parent context 212. Steps 1222 and 1224 are followed by the continue step 1226.

Figure 13:
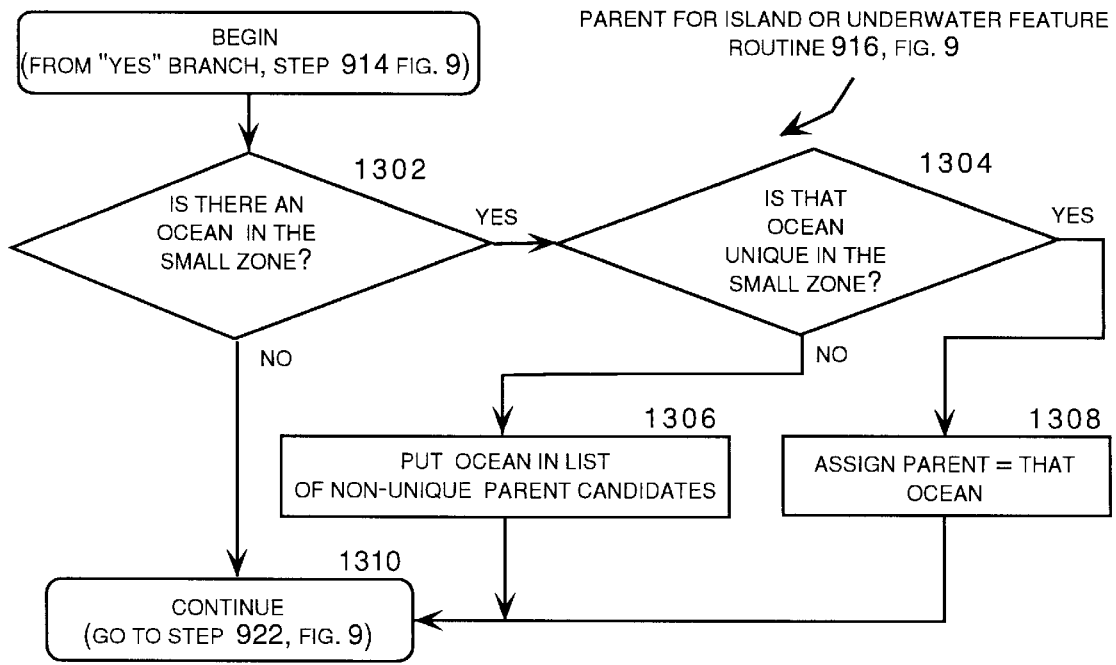
FIG. 13 is a logic flow diagram illustrating a routine for assigning a parent context to a map view that has an island or an underwater feature assigned as its place context.

FIG. 13 is a logic flow diagram illustrating routine 916 for assigning a parent context 212 to a map view that has an island or an underwater feature assigned as its place context 210. Routine 916 follows the "YES" branch from step 914 shown on FIG. 9. In step 1302, the multimedia atlas program 100 determines whether there is an ocean in the small zone 218. If there is an ocean in the small zone 218, the "YES" branch is followed to step 1304, in which the multimedia atlas program 100 determines whether the ocean is unique within the small zone 218. If the ocean is not unique within the small zone 218, the "NO" branch is followed to step 1306, in which the multimedia atlas program 100 places the ocean in the list of non-unique parent candidates. If the ocean is unique within the small zone 218, the "YES" branch is followed to step 1308, in which the multimedia atlas program 100 assigns the ocean to be the parent context 212. Steps 1306 and 1308 are followed by the continue step 1310, which returns to step 922 shown in FIG. 9.

Referring again to FIG. 9, routines 904, 908, 912, and 916 each look for parent candidates that are unique within their feature classes. But if there are no parent candidates that are unique within their feature classes, these routines may identify non-unique parent candidates. Therefore, routines 904, 908, 912, and 916 are followed by step 922, in which the multimedia atlas program 100 determines whether there are non-unique parent candidates. If there are non-unique parent candidates, the "YES" branch is followed to routine 924, which looks for a unique and interesting parent for the non-unique parent candidates.

Figure 14:
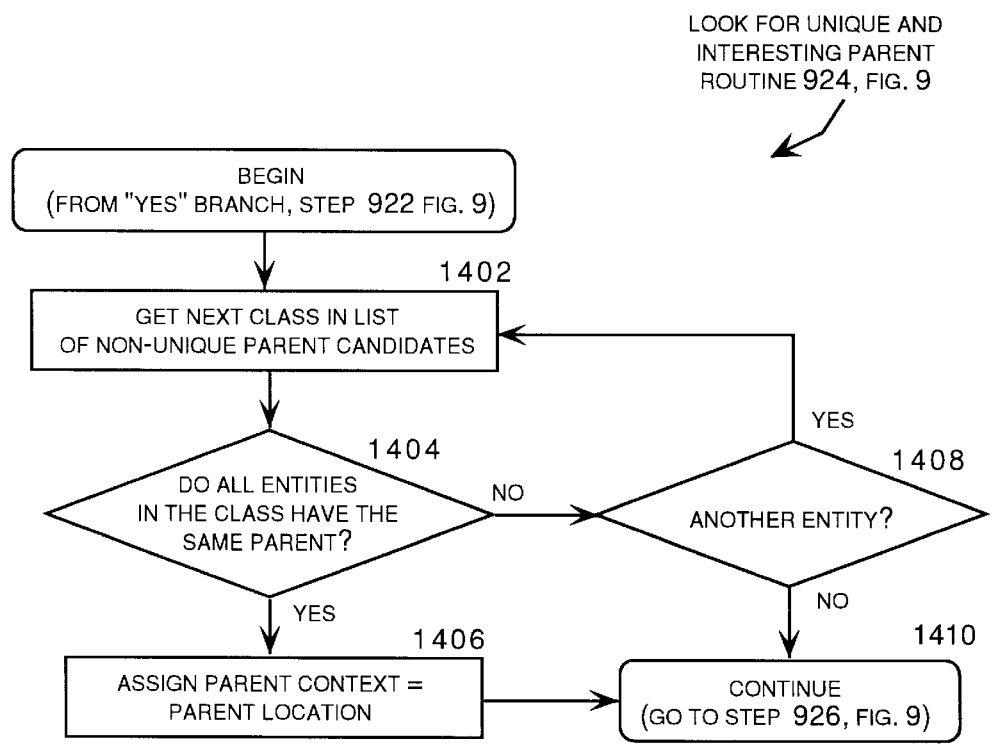
FIG. 14 is a logic flow diagram illustrating a routine for selecting a parent context for a map view from a list of non-unique parent candidates.

FIG. 14 is a logic flow diagram illustrating routine 924 for selecting a parent context 212 for a map view from a list of non-unique parent candidates. Routine 924 follows the "YES" branch from step 922 shown on FIG. 9. In step 1402, the multimedia atlas program 100 gets from the list of non-unique parent candidates the entities that associated with a particular feature class, which will be referred to as the current feature class. In step 1404, the multimedia atlas program 100 determines whether all of the map entities in the current feature class have the same parent entity. If all of the map entities in the current feature class have the same parent entity, the "YES" branch is followed to step 1406, in which the multimedia atlas program 100 assigns the parent entity to be the parent context 212. Step 1406 is followed by the continue step 1026. If all of the map entities in the current feature class have the same parent entity, the "YES" branch is followed to step 1406, in which the multimedia atlas program 100 assigns the parent entity to be the parent context 212. Step 1406 is followed by the continue step 1026.

If all of the map entities in the current feature class do not have the same parent entity, the "NO" branch is followed from step 1404 to step 1408, in which the multimedia atlas program 100 determines whether there is another feature class represented in the list of non-unique parent candidates. If there is another feature class represented in the list of non-unique parent candidates, the "YES" branch loops to step 1402, and the map entities in the next feature class represented in the list of non-unique parent candidates are processed. If there is not another feature class represented in the list of non-unique parent candidates, the "NO" branch is followed to the continue step 1410, which returns to step 926 shown in FIG. 9.

Referring again to FIG. 9, if there are no map entities in the list of non-unique parent candidates, the "NO" branch is followed from step 922 to step 926, in which the multimedia atlas program 100 determines whether the parent context 212 has been assigned. If the parent context 212 has been assigned, the "YES" branch is followed to the continue step 920, which returns to state 308 shown on FIG. 3. If the parent context 212 has not been assigned, the "NO" branch is followed to step 918, in which the multimedia atlas program 100 assigns the parent context 212 to be "the world." Step 918 is followed by the continue step 920.

In view of the foregoing, it will be appreciated that the present invention provides a method for automatically associating multimedia features with a map view "on the fly," which allows multimedia features to be associated with a map view that a user selects using a pan or zoom tool. It should be understood that the foregoing relates only to the exemplary embodiments of the present invention, and that numerous changes may be made therein without departing from the spirit and scope of the invention as defined by the following claims.

What is claimed is:

1. In a computer system having a graphical user interface including a display device and a user input device, a method for associating multimedia features with map views, comprising the steps of:

receiving a map view selection command from the user input device indicating a selected map view;

in response to the map view selection command,
        displaying the selected map view on the display device;
        assigning a place context to the map view, the place context having an associated multimedia feature, and displaying on the display device a multimedia feature control item associated with the multimedia feature;

receiving a multimedia feature selection command associated with the multimedia feature control item; and in response to the multimedia feature selection command, performing the selected multimedia feature.

2. The method of claim 1, wherein the step of receiving a map view selection command from the user input device indicating a selected map view comprises the steps of:

receiving a pan command from the user input device;

in response to the pan command, displaying on the display device a panning sequence of map views; and receiving a stop command from the user input device.

3. The method of claim 1, wherein the step of receiving a map view selection command from the user input device indicating a selected map view comprises the steps of:

receiving a pan command from the user input device;

in response to the zoom command, displaying on the display device a zooming sequence of map views; and receiving a stop command from the user input device.

4. The method of claim 1, further comprising the steps of:

assigning a parent context to the map view, the parent context having an associated multimedia feature; and displaying on the display device a parent context control item.

5. The method of claim 4, further comprising the steps of:

receiving from the user input device a parent context selection command associated with the parent context control item;

in response to the parent context selection command, displaying on the display device a control item associated with the parent context multimedia feature;

receiving from the user input device a parent context multimedia feature selection command associated with the parent context multimedia feature control item; and in response to the parent context multimedia feature selection command, performing the selected multimedia feature.

6. The method of claim 4, wherein the step of assigning a parent context to the map view further comprises the step of:

assigning the parent context by applying a predefined method that based on the feature class of the place context.

7. The method of claim 4, wherein the step of assigning a parent context to the map view further comprises the steps of:

defining a small zone within the map view;

identifying small zone entities that are wholly or partially displayed within the small zone;

if the place context is a small land feature and one and only one of the small zone entities is an administrative unit, assigning the parent context to be the administrative unit;

if the place context is a small land feature and one and only one of the small zone entities is a country, assigning the parent context to be the country; and if the place context is a small land feature and one and only one of the small zone entities is a continent, assigning the parent context to be the continent.

8. The method of claim 4, wherein the step of assigning a parent context to the map view further comprises the steps of:

defining a small zone within the map view;

identifying small zone entities that are wholly or partially displayed within the small zone;

if the place context is a country and one and only one of the small zone entities is a continent, assigning the parent context to be the continent; and if the place context is a country and one and only one of the small zone entities is an ocean, assigning the parent context to be the ocean.

9. The method of claim 4, wherein the step of assigning a parent context to the map view further comprises the steps of:

defining a small zone within the map view;

identifying small zone entities that are wholly or partially displayed within the small zone;

if the place context is an administrative unit and one and only one of the small zone entities is a country, assigning the parent context to be the country;

if the place context is an administrative unit and one and only one of the small zone entities is a continent, assigning the parent context to be the continent; and if the place context is an administrative unit and one and only one of the small zone entities is an ocean, assigning the parent context to be the ocean.

10. The method of claim 1, wherein the step of assigning a place context to the map view further comprises the step of:

if the scale of the map is above a large-scale threshold, assigning the place context to be a predefined large-scale context.

11. The method of claim 1, wherein the step of assigning a place context to the map view further comprises the steps of:

defining a small zone within the map view;

identifying small zone entities that are wholly or partially displayed within the small zone; and if the map displayed on the display device corresponds to a predefined best-view map associated with one of the small zone entities, assigning the place context to be the map entity associated with the predefined best-view map.

12. The method of claim 1, wherein the step of assigning a place context to the map view further comprises the steps of:

defining a large zone within the map view;

identifying large zone entities that are wholly or partially displayed within the large zone, each large zone entity being associated with a feature class;

comparing the feature classes associated with the large zone entities to a prioritized list of feature classes; and assigning the place context to be the large zone entity having the highest priority feature class.

13. The method of claim 1, wherein the step of assigning a place context to the map view further comprises the steps of:

defining a large zone within the map view;

identifying large zone entities that are wholly or partially displayed within the large zone, each large zone entity being associated with a feature class;

identifying an altitude associated with the map view;

comparing the feature classes associated with the large zone entities to a prioritized list of feature classes for the altitude associated with the map view; and assigning the place context to be the large zone entity having the highest priority feature class.

14. The method of claim 1, wherein the step of assigning a place context to the map view further comprises the steps of:

defining a large zone within the map view;

identifying large zone entities that are wholly or partially displayed within the large zone, each large zone entity being associated with a feature class;

identifying an altitude associated with the map view;

comparing the feature classes associated with the large zone entities to a prioritized list of feature classes for the altitude associated with the map view; and assigning the place context to be a selected one of the large zone entities that is associated with the highest priority feature class that is associated with one and only one large zone entity.

15. The method of claim 1, wherein the step of assigning a place context to the map view further comprises the steps of:

defining a large zone within the map view;

identifying large zone entities that are wholly or partially displayed within the large zone, each large zone entity being associated with a feature class;

identifying an altitude associated with the map view;

comparing the feature classes associated with the large zone entities to a prioritized list of feature classes for the altitude associated with the map view;

identifying a feature class on the prioritized list that has more than one associated large zone entity;

determining a parent entity associated with each large zone entity within the feature class that has more than one associated large zone entity; and if a common parent entity is associated with each large zone entity within the feature class that has more than one associated large zone entity, assigning the place context to be the common parent entity.

16. The method of claim 1, wherein the step of assigning a place context to the map view further comprises the steps of:

defining a small zone within the map view;

identifying small zone entities that are wholly or partially displayed within the small zone;

determining that a time-out condition has occurred because the process for assigning the place context to the map view has exceeded a time-out period; and in response to the time-out condition, assigning the place context to be a default entity within the small zone.

17. The method of claim 16, wherein the default entity is selected from the group including oceans, seas, and continents.

18. A computer-readable medium having computer-executable instructions for performing the steps of:

receiving a pan or zoom command from the user input device;

in response to the pan or zoom command, displaying on a display device a panning or zooming sequence of map views;

receiving a stop command from the user input device defining a map view selection command indicating a selected map view;

in response to the map view selection command, displaying the selected map view on the display device, assigning a place context to the map view, the place context having an associated multimedia feature, and displaying on the display device a multimedia feature control item associated with the multimedia feature;

receiving a multimedia feature selection command associated with the multimedia feature control item; and in response to the multimedia feature selection command, performing the selected multimedia feature.

19. The computer-readable medium of claim 18, wherein the step of assigning a place context to the map view further comprises the steps of:

defining a small zone within the map view;

identifying small zone entities that are wholly or partially displayed within the small zone; and if the map displayed on the display device corresponds to a predefined best-view map associated with one of the small zone entities, assigning the place context to be that map entity.

20. The computer-readable medium of claim 19, wherein the step of assigning a place context to the map view further comprises the steps of:

defining a large zone within the map view;

identifying large zone entities that are wholly or partially displayed within the large zone, each large zone entity being associated with a feature class;

identifying an altitude associated with the map view;

comparing the feature classes associated with the large zone entities to a prioritized list of feature classes for the altitude associated with the map view; and assigning the place context to be a selected one of the large zone entities that is associated with the highest priority feature class that is associated with one and only one large zone entity.

21. The method of claim 20, wherein the step of assigning a place context to the map view further comprises the steps of:

identifying a feature class on the prioritized list that has more than one associated large zone entity;

determining a parent entity associated with each large zone entity within the feature class that has more than one associated large zone entity; and if a common parent entity is associated with each large zone entity within the feature class that has more than one associated large zone entity, assigning the place context to be the common parent entity.

22. A computer-readable medium having computer-executable instructions for performing the steps of:

receiving a map view selection command from the user input device indicating a selected map view having an associated place context;

displaying the selected map view on the display device;

assigning a parent context to the map view, the parent context having an associated multimedia feature;

receiving from the user input device a parent context selection command associated with the parent context control item;

in response to the parent context selection command, displaying on the display device a control item associated with the parent context multimedia feature;

receiving from the user input device a parent context multimedia feature selection command associated with the parent context multimedia feature control item; and in response to the parent context multimedia feature selection command, performing the selected multimedia feature.

23. The method of claim 22, wherein the step of assigning a parent context to the map view further comprises the steps of:

defining a small zone within the map view;

identifying small zone entities that are wholly or partially displayed within the small zone;

if the place context is a small land feature and one and only one of the small zone entities is an administrative unit, assigning the parent context to be the administrative unit;

if the place context is a small land feature and one and only one of the small zone entities is a country, assigning the parent context to be the country; and if the place context is a small land feature and one and only one of the small zone entities is a continent, assigning the parent context to be the continent.

24. The method of claim 23, wherein the step of assigning a parent context to the map view further comprises the steps of:

if the place context is a country and one and only one of the small zone entities is a continent, assigning the parent context to be the continent; and if the place context is a country and one and only one of the small zone entities is an ocean, assigning the parent context to be the ocean.

25. The method of claim 24, wherein the step of assigning a parent context to the map view further comprises the steps of:

if the place context is an administrative unit and one and only one of the small zone entities is a country, assigning the parent context to be the country;

if the place context is an administrative unit and one and only one of the small zone entities is a continent, assigning the parent context to be the continent; and if the place context is an administrative unit and one and only one of the small zone entities is an ocean, assigning the parent context to be the ocean.

* * * * *